March 2, 1954 — J. L. WHITSEL — 2,670,674
AUTOMATIC EGG FRYER
Filed Aug. 20, 1949 — 15 Sheets-Sheet 1

Inventor
JAMES L. WHITSEL
Attorney

March 2, 1954

J. L. WHITSEL 2,670,674

AUTOMATIC EGG FRYER

Filed Aug. 20, 1949

Inventor
JAMES L. WHITSEL
By Howet Sweet
Attorney

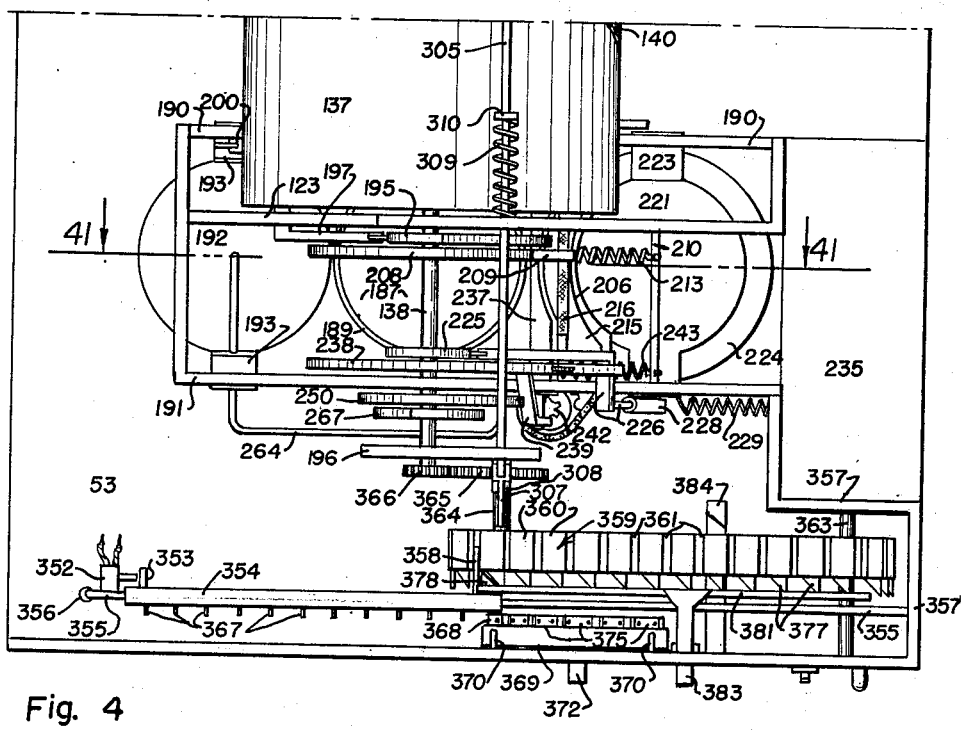
Fig. 4
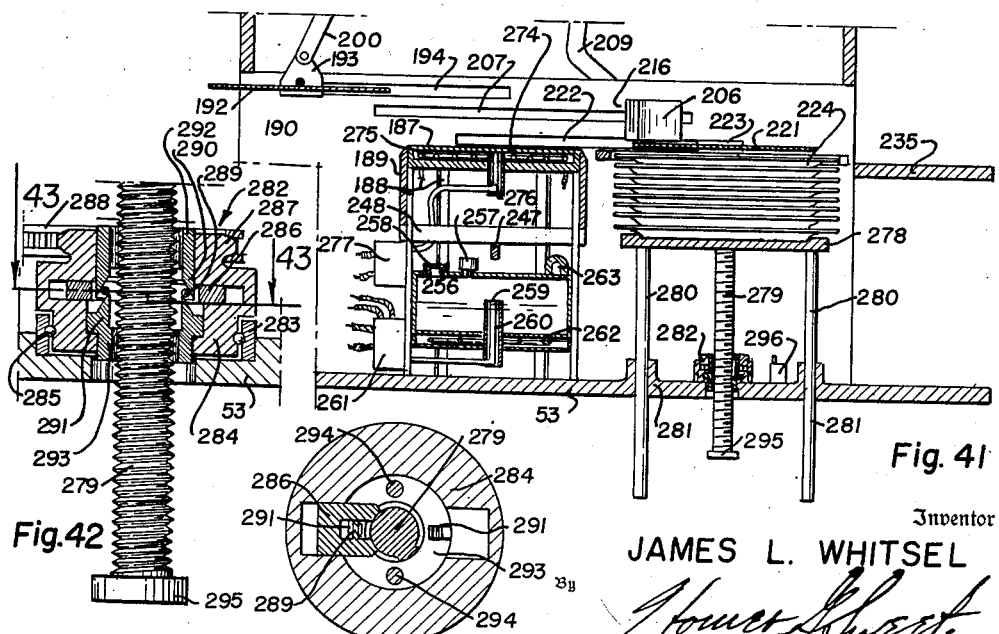
Fig. 42
Fig. 43
Fig. 41
Inventor
JAMES L. WHITSEL
Attorney March 2, 1954

J. L. WHITSEL

AUTOMATIC EGG FRYER 2,670,674

Filed Aug. 20, 1949

Inventor
JAMES L. WHITSEL

By

Attorney

March 2, 1954 — J. L. WHITSEL — 2,670,674
AUTOMATIC EGG FRYER
Filed Aug. 20, 1949 — 15 Sheets-Sheet 6
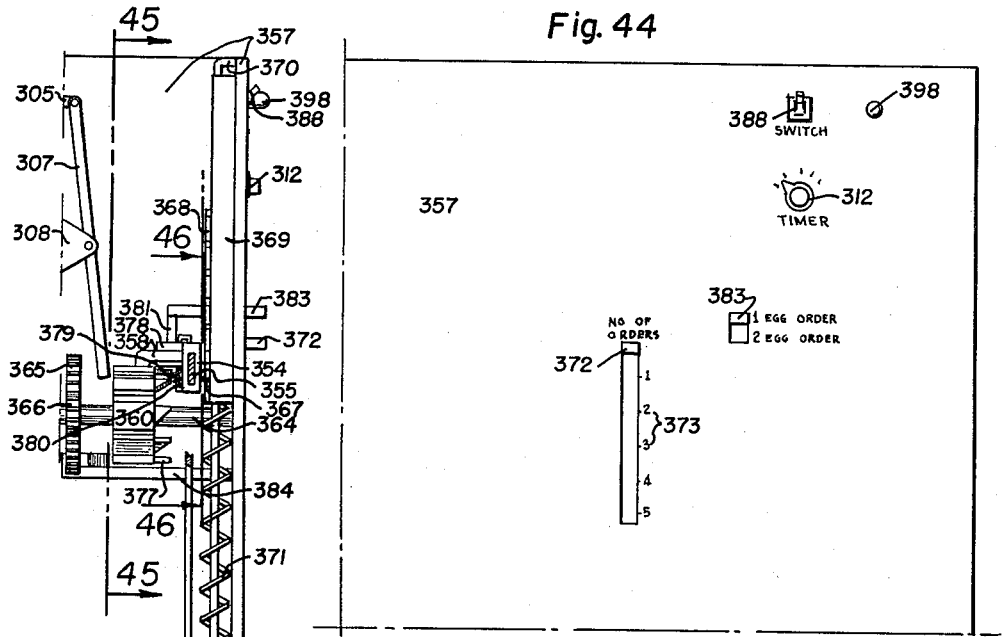
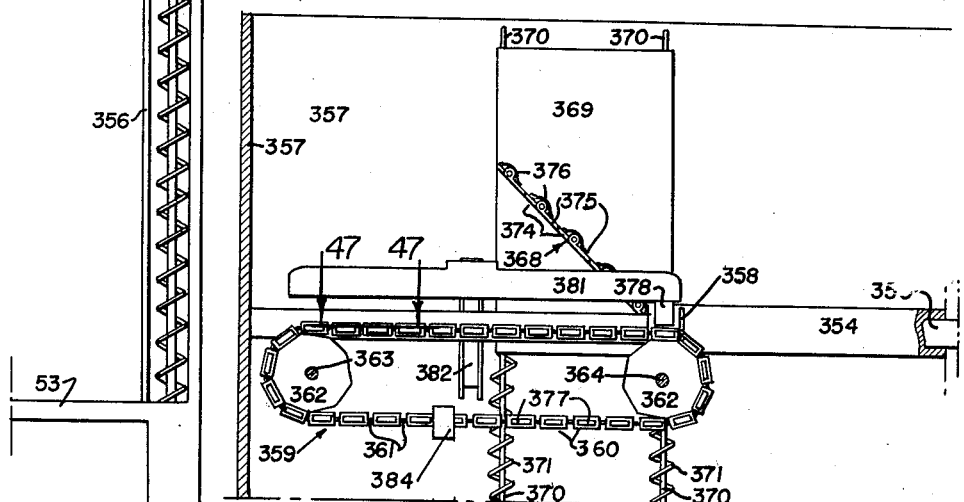
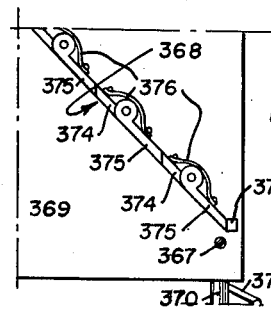
INVENTOR.
JAMES L. WHITSEL
BY
ATTORNEY March 2, 1954

J. L. WHITSEL 2,670,674

AUTOMATIC EGG FRYER

Filed Aug. 20, 1949

INVENTOR.
JAMES L. WHITSEL
BY
ATTORNEY

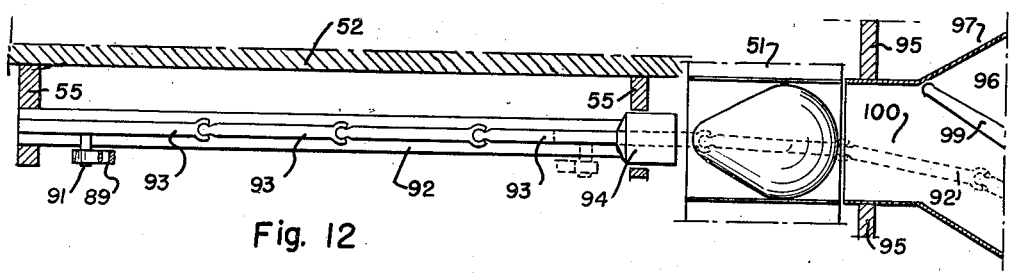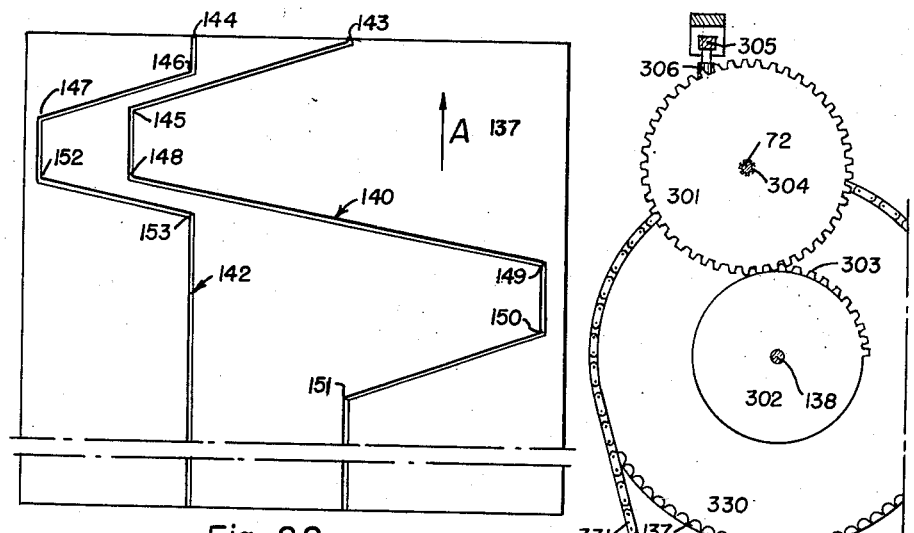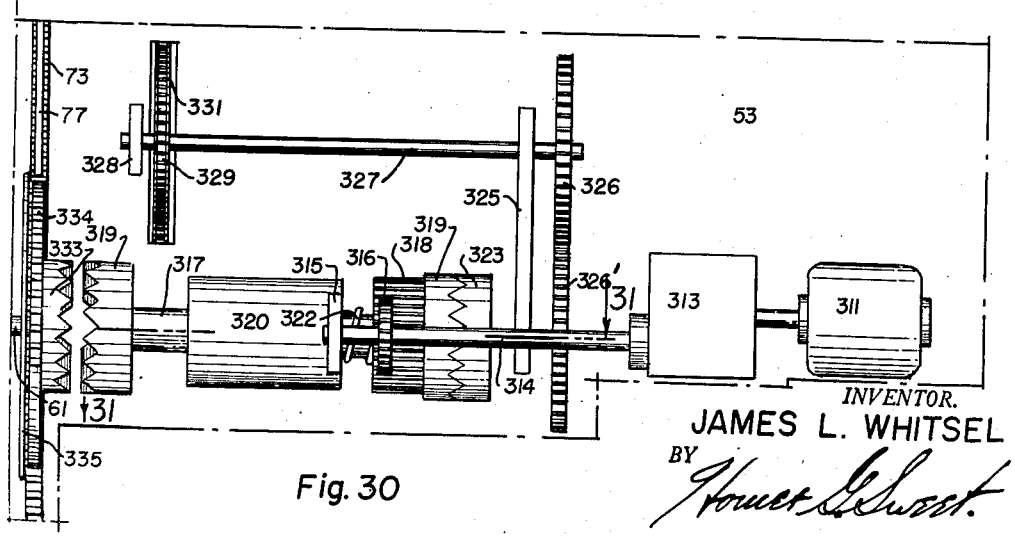

March 2, 1954
J. L. WHITSEL
2,670,674
AUTOMATIC EGG FRYER
Filed Aug. 20, 1949
15 Sheets-Sheet 10
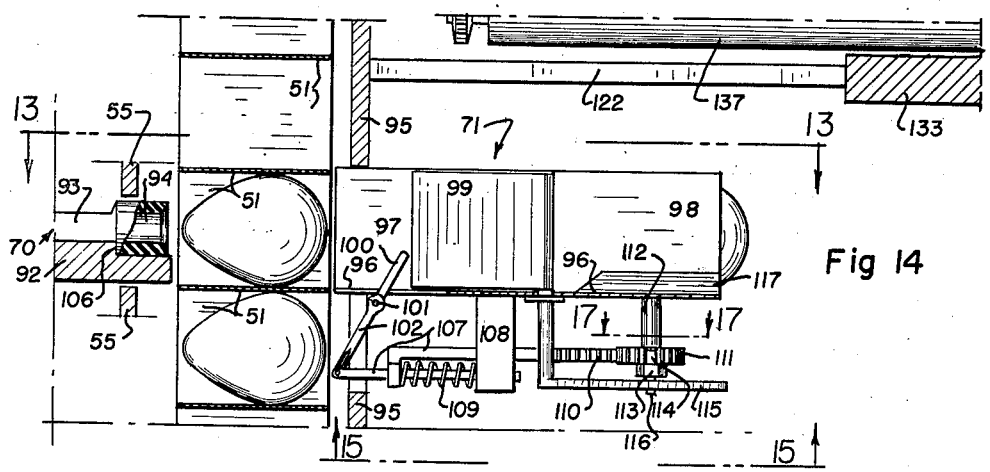
Fig. 14
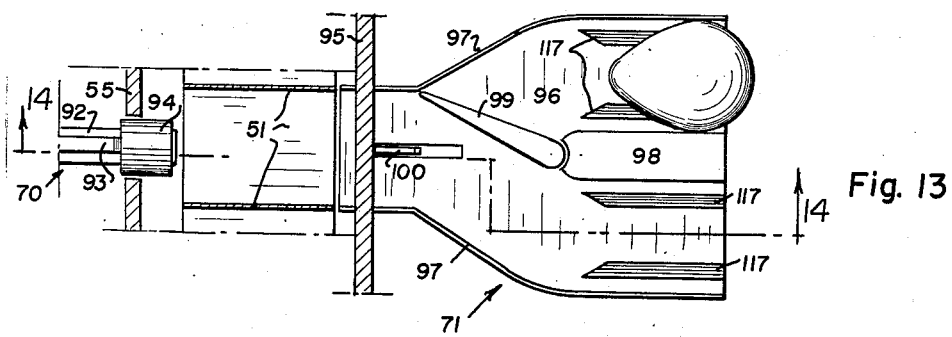
Fig. 13
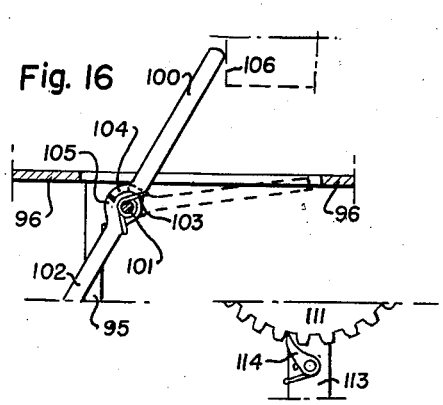
Fig. 16
Fig. 17
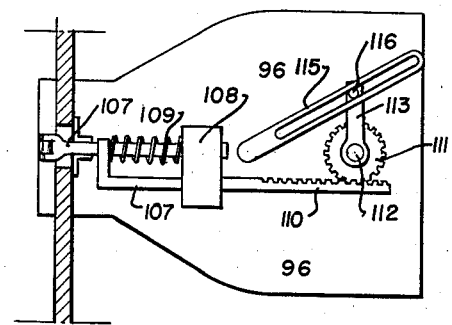
Fig. 15
Inventor
JAMES L. WHITSEL
By
Homer L. Sweet
Attorney March 2, 1954  J. L. WHITSEL  2,670,674
AUTOMATIC EGG FRYER
Filed Aug. 20, 1949  15 Sheets-Sheet 11

Inventor
JAMES L. WHITSEL
Attorney

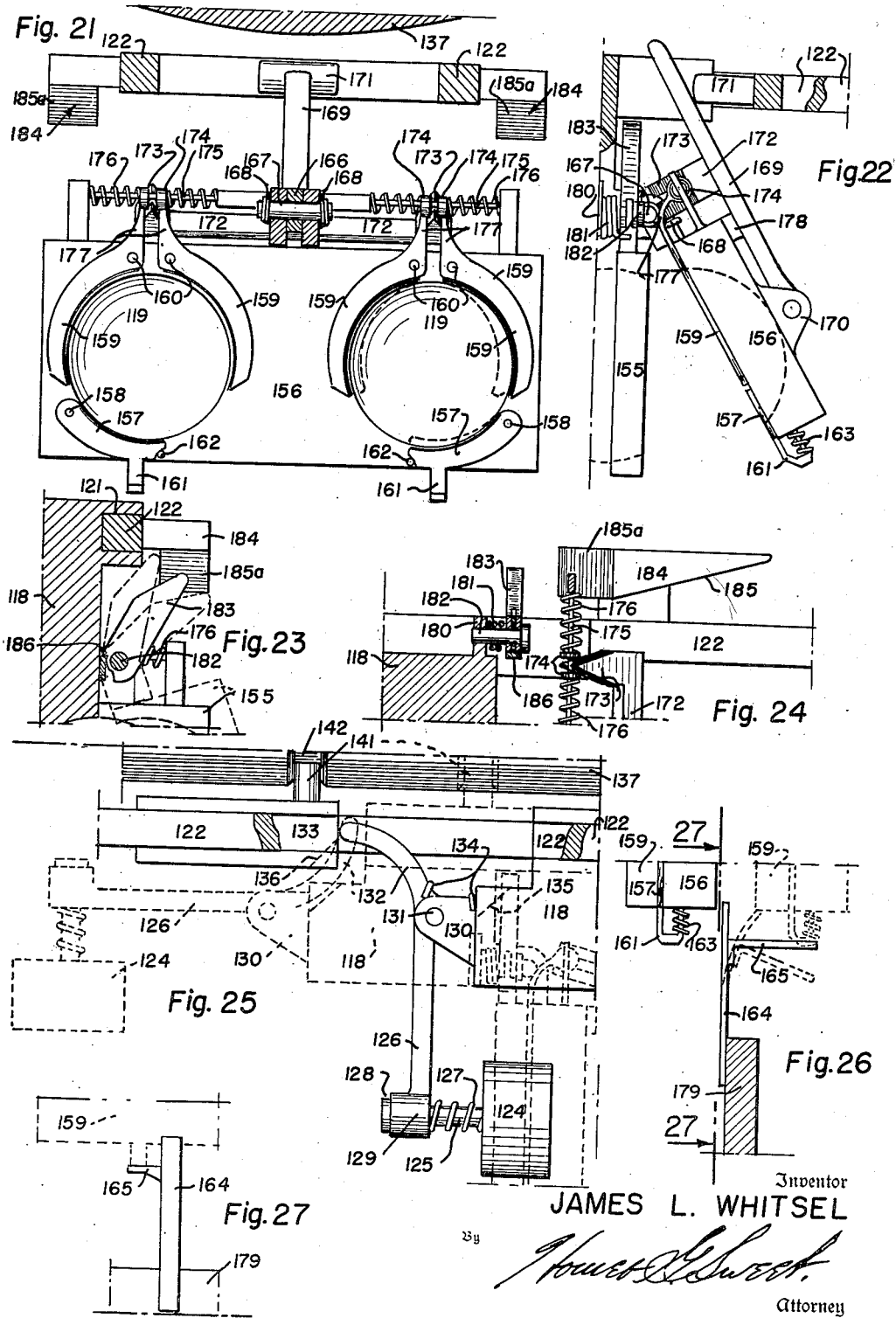

March 2, 1954          J. L. WHITSEL          2,670,674
AUTOMATIC EGG FRYER

Filed Aug. 20, 1949                                              15 Sheets-Sheet 13

INVENTOR.
JAMES L. WHITSEL
BY
ATTORNEY

March 2, 1954

J. L. WHITSEL 2,670,674

AUTOMATIC EGG FRYER

Filed Aug. 20, 1949

Inventor
JAMES L. WHITSEL

By *Howett Sweet*

Attorney

March 2, 1954
J. L. WHITSEL
2,670,674
AUTOMATIC EGG FRYER
Filed Aug. 20, 1949
15 Sheets-Sheet 15
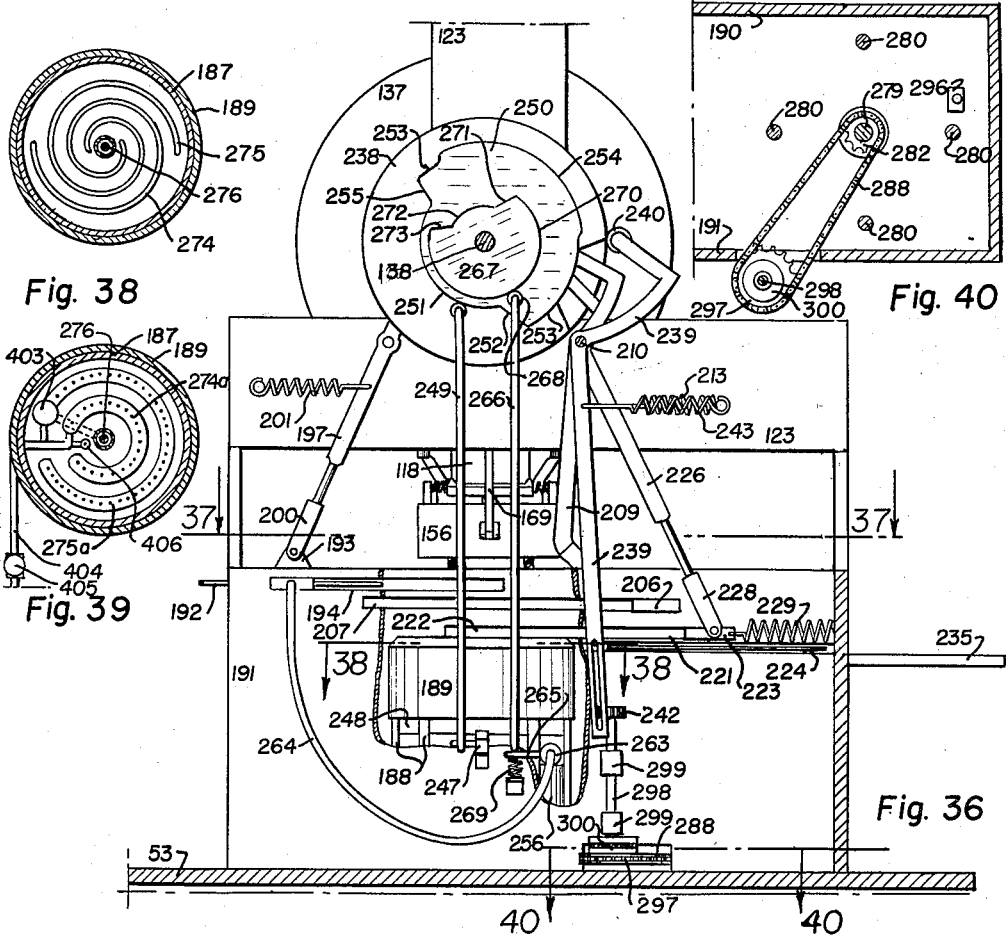
Fig. 38
Fig. 39
Fig. 40
Fig. 36
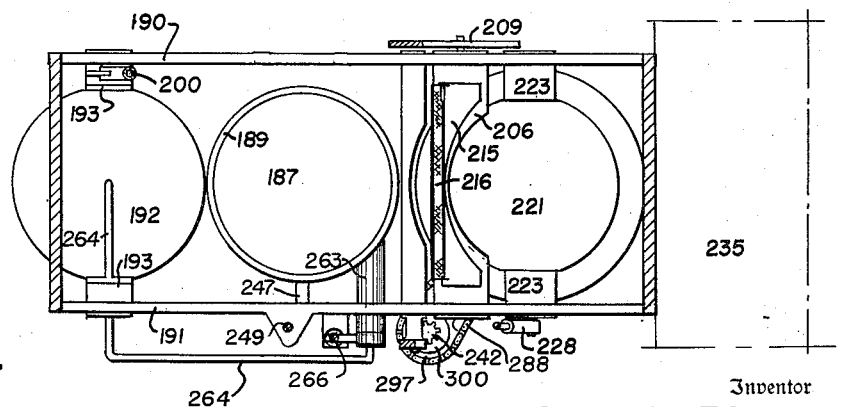
Fig. 37
Inventor
JAMES L. WHITSEL
By Homer G. Sweet
Attorney Patented Mar. 2, 1954

2,670,674

UNITED STATES PATENT OFFICE 2,670,674

AUTOMATIC EGG FRYER

James L. Whitsel, near Williamsburg, Pa.

Application August 20, 1949, Serial No. 111,455

12 Claims. (Cl. 99—334)

This invention relates to cooking apparatus and more particularly to such cooking apparatus as used in the automatic frying of eggs, having as an object an improved mechanical organization automatically operable to selectively and individually prepare eggs from a conventional container for consumption, in response to manually charged option indications.

A further object of this invention is to provide an improved egg-frying machine automatically operable to effect the movement of eggs from a conventional container through the stages of breaking, cooking, and delivery in reaction to manually charged option indications.

A further object of this invention is to provide, in an automatic egg-frying machine, improved means for receiving a charge of eggs contained within a conventional container, and automatic means for selectively and individually removing eggs from said container.

A further object of this invention is to provide automatic means for selectively preparing single or multiple cooked egg orders.

A further object of this invention is to provide improved automatic means for moving eggs to cooking instrumentalities, thereupon breaking eggs and disposing of the shells.

A further object of this invention is to provide improved automatic means for the cooking and simultaneous basting of eggs.

A further object of this invention is to provide improved means in operative correlation with an automatic egg-frying machine automatically effective to transport and plate-deliver completed egg orders produced by the said machine.

A further object of this invention is to provide improved means for the accommodation and automatic supply of serving plates in operative correlation with the delivery of cooked egg orders from an automatic egg-frying machine.

A further object of this invention is to provide an improved egg-frying machine that is operatively fully automatic in reaction to selective, manually imposed, option indications, rapid in the completion and successive delivery of egg orders, free from onerous servicing and maintenance requirements, compact and of small size in relation to its output capacity, susceptible of construction in size and capacity variations, suited to all practical requirements, adaptable to coin control as an automatic vending device, positive and efficient in attainment of the ends for which designed, and durable throughout a long life of actual use.

With the foregoing and other objects in view, my invention consists in the construction, arrangement, and combination of elements hereinafter set forth, pointed out in my claims, and illustrated by the accompanying drawings, in which—

Figure 4 shows, on an enlarged scale, that portion of Figure 1 to the right of line 3—3 indicated thereon.

Figure 7 shows, on an enlarged scale, that portion of Figure 2 to the right of line 6—6 indicated thereon, with sections of elements removed to show otherwise concealed construction.

Figure 12 shows, on an enlarged scale, a fragmentary detail section taken on the indicated line 12—12 of Figure 5.

Figure 13 shows, on an enlarged scale, elements including a selector chamber as taken on the indicated line 13—13 of Figure 6.

Figure 14 is a detail section taken on the indicated line 14—14 of Figure 13.

Figure 15 is a bottom view of the selector chamber as viewed from the indicated line 15—15 of Figure 14.

Figure 16 is a fragmentary portion of the elements illustrated at Figure 14, on an enlarged scale, dotted lines indicating alternative position of elements therein illustrated.

Figure 17 is a fragmentary, detail, plan view of ratchet means as viewed from the indicated line 17—17 of Figure 14.

Figure 21 is a sectional elevation view as taken on the indicated line 21—21 of Figure 18, the broken lines showing alternate positions of egg-breaking means.

Figure 22 shows certain of the elements illustrated in Figure 18 at right angles to said latter view and in operative position for opening and depositing the contents of an egg.

Figure 23 is a fragmentary detail section taken on the indicated line 23—23 of Figure 18, broken lines in the view denoting alternative positions of relatively movable elements.

Figure 24 is a fragmentary detail section taken on the indicated line 24—24 of Figure 19.

Figure 25 shows certain of the elements illustrated in Figure 18 at an alternative operating stage, broken lines in the view denoting alternative operative positions of relatively movable elements.

Figure 26 shows a lower fragment of the carrier means illustrated in Figure 18 as operatively associated with elements illustrated in Figure 6, broken lines in the view denoting alternative positions of the movable elements.

Figure 27 is a side elevation of the elements illustrated in Figure 26 as viewed from the indicated line 27—27 of Figure 26, broken lines indicating the relative position of elements illustrated in Figure 26.

Figure 28 is a development of the surface of a cylindrical cam illustrated in Figure 6, a portion of the surface being broken away to conserve space.

Figure 29 is a fragmentary, detail section taken on the indicated line 29—29 of Figure 6.

Figure 30 is a bottom view of the driving elements illustrated in Figure 2.

Figure 36 is a fragmentary, detail section taken on the indicated line 36—36 of Figure 6.

Figure 37 is a fragmentary, detail section taken on the indicated line 37—37 of Figure 36.

Figure 38 is a fragmentary, detail section taken on the indicated line 38—38 of Figure 36, illustrating electrical heating elements therein.

Figure 39 is a view similar to Figure 38 illustrating, as an alternative embodiment, gas heating elements.

Figure 40 is a fragmentary, detail section taken on the indicated line 40—40 of Figure 36, illustrating mechanisms for the actuation of plate stack lifting means.

Figure 41 is a fragmentary, detail section taken on the indicated line 41—41 of Figure 4.

Figure 42 is a fragmentary detail, on an enlarged scale, of plate stack lifting elements illustrated in Figure 41.

Figure 43 is a fragmentary, detail section taken on the indicated line 43—43 of Figure 42.

Figure 44 is a fragmentary elevation, on an enlarged scale, of the right-hand end of the machine shown in Figure 1, illustrating an arrangement of selective actuating controls.

Figure 45 is a fragmentary sectional elevation view of selective indicating means, as taken on the indicated line 45—45 of Figure 7.

Figure 46 is a fragmentary, detail section taken on the indicated line 46—46 of Figure 7.

Figure 1:
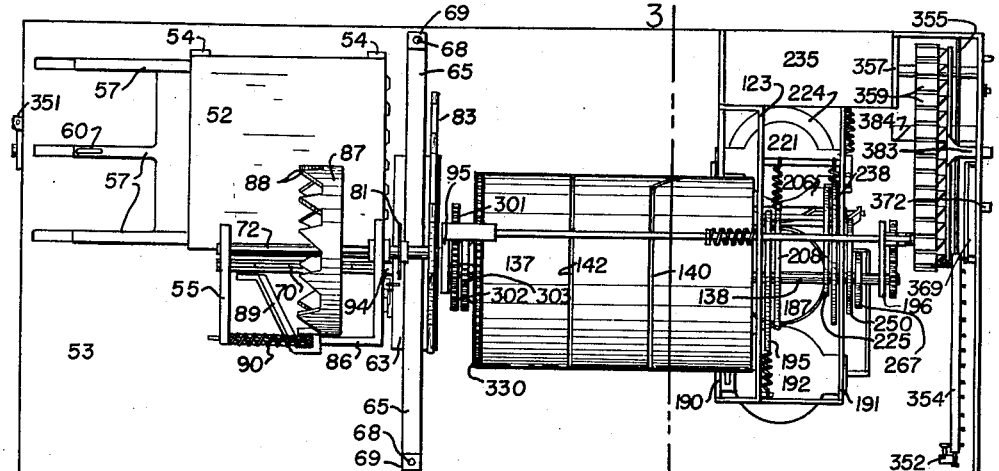
Figure 1 is a top plan view showing a typical association of elements operable in accordance with the invention.
Figure 2:
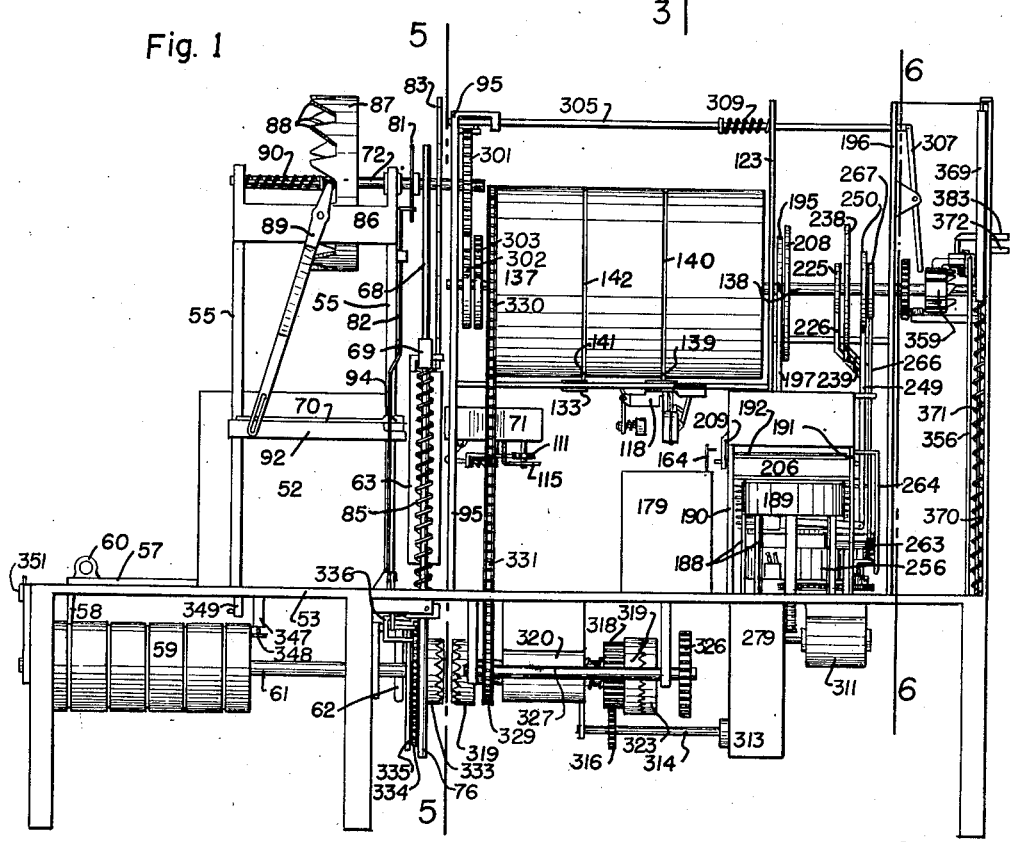
Figure 2 is a side elevation of the association of elements shown in Figure 1.
Figure 3:
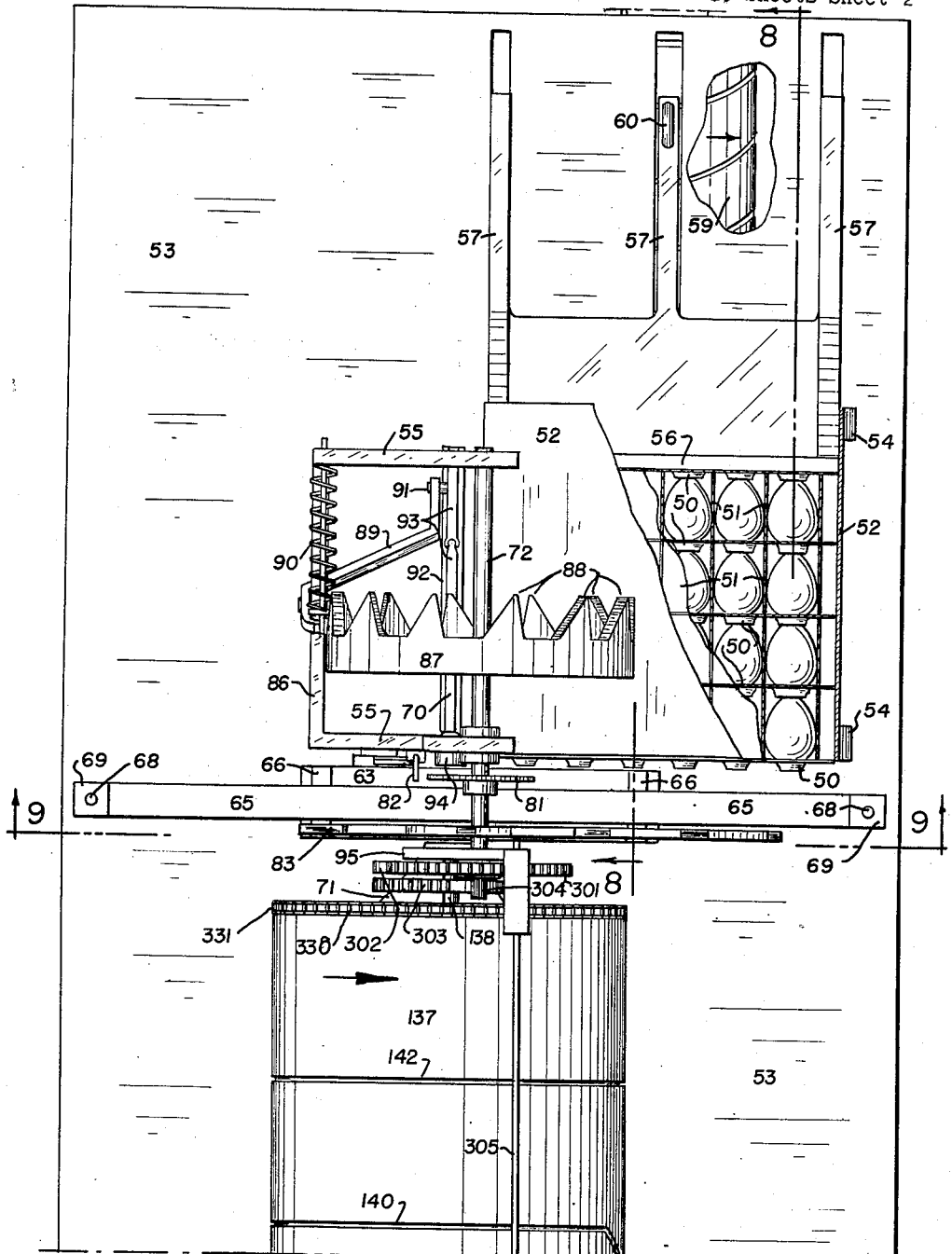
Figure 3 shows, on an enlarged scale, that portion of Figure 1 to the left of line 3—3 indicated thereon, with sections of covering elements removed to show otherwise concealed relationships.
Figure 11:
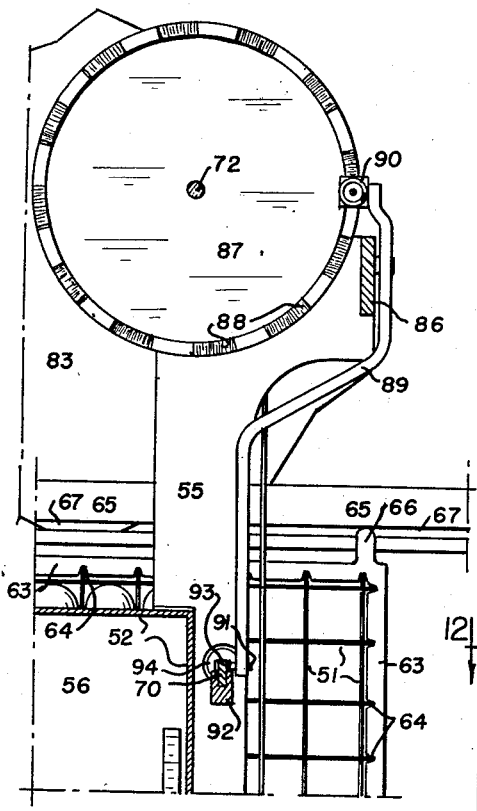
Figure 11 is a fragmentary detail section taken on the indicated line 11—11 of Figure 5.
Figure 5:
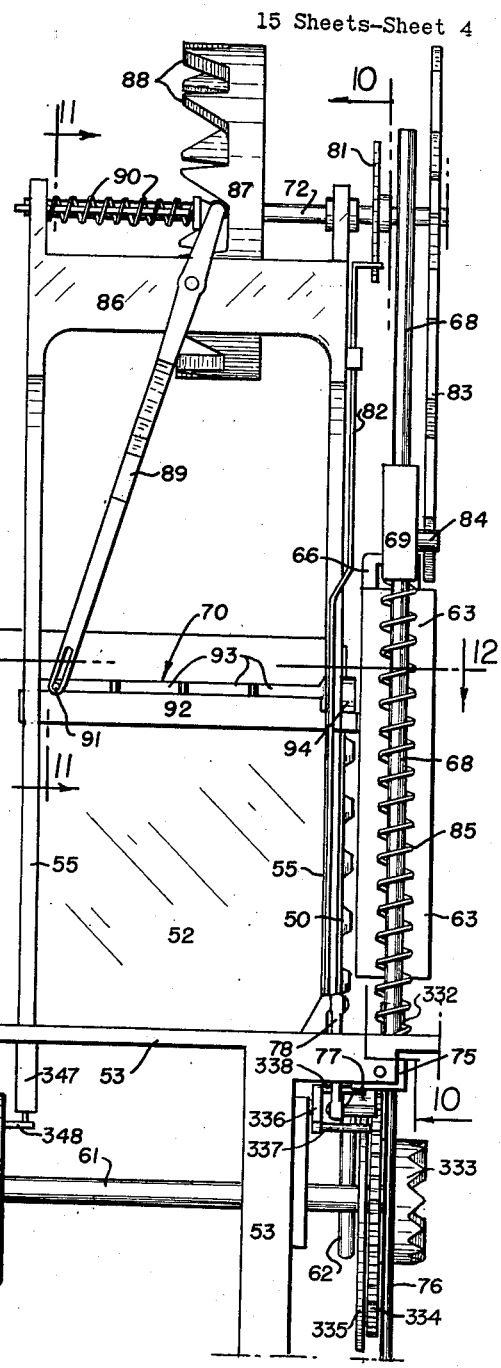
Figure 5 shows, on an enlarged scale, that portion of Figure 2 to the left of line 5—5 indicated thereon.

In the illustrated embodiment of the invention, a conventional half-crate containing fifteen dozen eggs is used as a charge, and it is contemplated that the eggs are packed in conventional manner in half-crate or full crate boxes with each half-crate of eggs being divided into five layers by the usual square, indented, separator plates 50 and with the three dozen eggs in each layer further separated and confined into individual compartments, six square, by the usual paper grilles 51. In preparation of the charge, the crate box is removed from the eggs by cutting or tearing the same away in such a manner as not to disturb the egg layers formed by the separator plates, the desirable position of the eggs being such that the separator plates lie horizontal, forming an egg stack. A receptacle 52, in the form of a cubical shell with opposing ends open and of such size as to conformably receive the egg stack, is then placed over the egg stack to confine the eggs therein by slidably and frictionally holding and positioning the separator plates 50, movement of the eggs into and through the open ends of the receptacle 52 being normal to the plane of the separator plates.

The charged receptacle 52 is placed on a table 53, comprising the supporting base of the egg-frying machine, in fixed operative relation with other elements later to be described, and is held thereon by means of lugs 54 and the uprights 55 of a bent hereinafter further described, the receptacle 52 being oriented to dispose the separator plates 50 in vertical planes with the large ends of the eggs leading in the direction of their subsequent movement. Movement of the eggs through and from the receptacle 52 is effected by a platen 56, slidable interiorly of the receptacle 52 in parallel bearing engagement against the exposed separator plate 50 trailing in the direction of desired egg charge travel, said platen being provided with web-reinforced guide arms 57 extended perpendicular thereto to clear the receptacle 52 and slidably engaged and aligned in guide slots in the table 53; the central guide arm 57 mounting a fixedly and perpendicularly related finger 58 extending through its guide slot to reactive engagement with a cam 59. A ring 60 is also provided on the central guide arm of the platen as a means for manually lifting the finger 58 from its engagement with the cam 59 to facilitate removal of the platen from the receptacle, as when an egg charge is exhausted, and to permit resetting of the finger relative to the cam, as when the platen is readjusted to accommodate a new egg charge. The cam 59 has the form of a grooved cylinder coaxially fixed on a shaft 61 journaled for rotation in spaced parallelism with and beneath the table 53 for intermittent actuation through means later to be explained; the grooved path of the cam being arranged in five stages to progressively shift the platen through the receptacle 52 a distance of one egg layer thickness at a time thereby feeding the egg charge into the machine layer by layer.

The movement of the egg charge through the receptacle first clears the leading separator plate 50 from the confining walls of the receptacle, whereupon the plate falls and is discharged from the machine by chute 62. The exposed leading egg layer is then extended from the receptacle into a rectangular carriage 63 registrable with the delivery end thereof in correlation with the intermittent shift of the egg charge deriving from rotation of the cam 59, the aperture of the carriage being of such form and dimensions as to receive and slidably accommodate the egg layer comprising the paper grilles 51 and individual eggs therein. Inner wall faces of the carriage 63 are conveniently provided with grooves 64 susceptible of alignment and supporting engagement with the projecting edges of the grille 51, such grooves being preferably flared at their ends adjacent to the receptacle 52 to facilitate entrance of the grille edges therein. Any paper grille retained in the carriage 63 from a preceding egg layer will be ejected from the carriage 63 by movement of another egg layer thereinto, the ejected material falling onto the table 53, whence it may be readily cleared. The carriage 63 is in the form of a square frame of depth corresponding with that of an egg layer, and is mounted for altitudinal and lateral adjustment in a vertical plane parallel with the egg layers in the receptacle 52, to which end said frame is slidably suspended from a horizontal cross arm 65 by means of fingers 66 engaging in a groove 67 of the cross arm. The cross arm 65 is slidably mounted on vertical standards 68 through the agency of heads 69 at the ends of the cross arm, such heads being of lengths suitable to prevent torsional binding of the cross arm on the standards. The horizontal cross arm is disposed in a plane parallel with the egg layers in the receptacle, to permit the carriage 63 to be horizontally adjustable thereon and altitudinally adjustable therewith in such plane to successively position individual eggs of the grille within the carriage in line with a pusher 70 which is operable to progressively remove the eggs from the grille and transfer them into a selector chamber 71 for processing as will be later described.

The eggs in the conventionally-charged grille within the carriage 63 are thereby positioned in six horizontal rows and six vertical columns, and are successively availed of by columns, the carriage being progressively shifted horizontally to register a column with the pusher 70 and then intermittently advanced vertically to register the individual eggs of the column with said pusher. Both the horizontal and vertical movements of the carriage derive from cams attached to feeder shaft 72 which is suitably journaled on the bent 55 in symmetrical relation between the vertical standards 68 and sufficiently above the carriage to provide operative clearance. The feeder shaft 72 is intermittently operable in correlation with certain other mechanisms and alternatively synchronously responsive to actuation of the cam 59 and other elements on shaft 61, all as later to be described.

A rack bar 73 is horizontally and slidably mounted in guides 74 beneath the table 53 for reciprocation in parallel with the plane of movement of the carriage, and said rack bar is formed with a suitably-disposed head 75 which slidably receives a finger 76 fixed to and depending vertically from the carriage 63 through a suitable slot in the table 53 whereby movement of the rack bar effects corresponding horizontal movement of the carriage in all of its vertical positions. Shift of the rack bar 73 to position the egg columns in the carriage in line with the pusher 70 is had through a detent 77 hinged to one arm of a bell-crank 78 operatively paralleling the rack bar and mounted upon the table 53; the detent and bell-crank being normally and resiliently positioned by springs 79 and 80 to hold the detent extended toward the receptacle 52 with its hooked free end against the rack bar 73, whereby retraction of the detent consequent upon oscillation of the bell-crank effects engagement of the detent end hook with a tooth in the rack bar. Such oscillation of the bell-crank is effected by a cam 81 mounted on the feeder shaft 72, the cam comprising two legs 180 degrees apart which function to alternately depress the rod 82 connected to one arm of the bell-crank 78 during shaft 72 rotation, the travel of the detent 77 being regulated by the amount the rod 82 is depressed. The travel of the detent 77 is somewhat greater than the resulting movement of the rack 73 because the hooked free end of the detent is not engaged with the teeth of the rack with the detent in its extended position, and an initial movement of the detent is necessary to permit such engagement. Such initial movement or slack is necessary as a compensating factor because the horizontal movement of the carriage from its position of registration with the receptacle to registration of the first egg column with the pusher is of a slightly greater distance than subsequent horizontal movements of the carriage from position of registration of one egg column with the pusher to such registration of the adjacent column.

A cam 83 is mounted on the shaft 72 to engage a roller follower 84 attached to the cross arm 65 therebelow, whereby rotation of the cam 83 imparts a vertical oscillation of the cross arm 65 and the carriage attached thereto, for the cross arm is resiliently held upwards with the follower 84 against the cam 83 by compression springs 85 surrounding the standards 68 below the heads 69. The cam 83 is proportioned to raise and lower the carriage 63 sufficiently to register all eggs in a column with the pusher 70, and a complete revolution of the cam establishes two cycles, one of lowering and one of raising, which conveniently accommodate two columns of eggs. It follows that with six eggs in each column, a 30-degree rotation of the cam 83 may be allotted to the registration of each egg with and for removal by the pusher 70; accordingly, the intermittent rotation of the shaft 72 hereinbefore referred to is in 30-degree increments as accomplished in a manner hereinafter described. Each 30-degree increment of cam 83 rotation is separated into two phases of action, a phase of moving the carriage into position for registration of an egg with the pusher, and a phase of holding such position while the egg is being removed therefrom. These phases are conveniently represented by 15-degree arcs, with corresponding segments formed on the cam, the segments operable to shift the carriage altitudinally being each of varying radius, and the segments operable to hold the carriage being each of constant radius. At the extremities of altitudinal movement of the carriage and upon removal of the last egg from a column, the cam does not altitudinally shift the carriage, but the operating radius thereof remains constant, and in this interval of cam 83 travel the cam 81 acts to depress the rod 82 to shift the carriage horizontally for alignment of another egg column with the pusher 70 as hereinbefore explained, this movement occurring in a 15-degree rotation of shaft 72. Following such horizontal shift, an egg in the so-aligned column is in registration with the pusher whereupon it may be removed from the carriage, during a further 15-degree rotation of the shaft 72, and altitudinal shifting of the carriage may then proceed to successive registration and discharge of the eggs remaining in the column. The horizontal shifting of the carriage thus occurs alternately at the top and bottom of consecutive egg columns at each 180 degree rotation of the shaft 72, the arms of the cam 81 being correlated with cam 83 to effect such horizontal shift at each extreme of the carriage altitudinal travel.

The two uprights of the bent 55 spacedly adjacent the receptacle 52 are joined by a sill 86, parallel with the shaft 72 but offset horizontally therefrom to provide clearance for an actuator cam 87 mounted upon said shaft 72 between the uprights. This cam 87 is cylindrically formed with the cylindrical surface at one of its ends worked to define regularly spaced lobes 88 directed away from the carriage 63, and preferably each of 15-degree arc in a 30-degree arc interval with flat sections therebetween. These lobes oscillate the follower 89 to intermittently extend the pusher 70, engaged therewith, toward and through the carriage in alternating correlation with the cams 81 and 83, the reaction interval of the pusher being during that phase of cam action when the carriage is motionless, as when the follower 84 is on a constant radius segment of cam 83. The follower 89 is hinged to the sill 86 to form a rocker arm in a vertical plane normal to the plane of movement of the carriage 63, the upper portion of the arm being extended and offset to contact of its free end with the lobed face of the cylindrical cam 87 and being resiliently held thereagainst by a compression spring 90, and the lower portion of the arm being slottedly formed, extended and offset for slidable engagement with the pin 91 on the pusher 70. The pusher 70 is slidably mounted in a grooved bar 92 which is parallel with the shaft 72, normal to the plane of movement of the carriage 63, aligned altitudinally with the top egg row in the receptacle 52, and laterally spaced from said receptacle in alignment with egg columns of the carriage removed one step from the receptacle. This position is such that the pusher will react to eject the top egg of the first column upon initial horizontal movement of the carriage from the receptacle, first subsequent movements of the carriage under the influence of the cam 83 being upwards to successively expose the first column of eggs in the carriage to the pusher from the top downwards.

The pusher 70 is formed as a plurality of vertically-axised, hinge-linked sections 93 whereof the end section adjacent to the carriage 63 terminates in a head 94 and the section at the other end of the assembly carries the pin 91 through which movement of the pusher is effected by oscillation of the follower 89. The head 94 is preferably cylindrical, axially aligned with the positioned compartment of the grille 51 and the egg therein, formed with a beveled end orifice therein opposed to and adapted to receive the small end of an egg, and of resilient material, such as rubber, frictionally reactive to secure gripping of the egg as it is pushed from the carriage into the selector chamber 71 with the large end of the egg leading in the direction of movement. While the pusher is held against flexure within the groove in the bar 92, the hinged construction thereof permits horizontal deviation in the selector chamber to direct the egg through the passages therewithin.

The selector chamber 71 mounted in a vertical frame 95 is formed as a diverging chute having a horizontally-disposed floor 96 and sidewalls 97 perpendicular thereto, the entrance adjacent to the carriage being in alignment with the positioned compartment of the grille 51 registered with the pusher 70 and providing for sliding movement of the egg from said compartment into the selector along the axis of the compartment-positioned egg until the egg is well within the selector. Beyond the initial egg-receiving zone of the selector 97, the sidewalls diverge and the passageway therebetween is bifurcated by a partition 98 centrally upstanding longitudinally of the selector to provide two channels symmetrically positioned at the discharge end of the chamber. At the inner end of the partition 98 a flap 99 vertically upstands in a hinged mounting to swingably close as a gate against the sidewalls 97 at the points of their diversion to selectively and alternatively direct the eggs into the channels forming the discharge end of the chamber. Positioning of the flap 99 is effected through engagement of the pusher 94 with a lever 100 on the return stroke of said pusher from the selector chamber through a mechanism about to be described. The lever 100 is hingedly mounted on pin 101 attached to the frame 95 at the underside of floor 96 and extends upward through a suitable slotted opening therein designed to permit desired oscillation of the lever 100. Another lever 102 is also hingedly mounted on the pin 101 and is normally held in opposite extension and alignment with the lever 100 by a spring 103 and by hub offsets 104 and 105 on the respective levers, the spring 103 permitting resilient oscillation of lever 100 without movement of lever 102 in a clockwise direction as viewed in Figure 16, as when it is pushed downwards into the aforementioned slot in floor 96 upon the passage of an egg through the selector chamber 71, while the offsets 104 and 105 engage to cause coaction of the levers 100 and 102 under counterclockwise oscillation of the lever 100, as is occasioned by the return movement of the pusher 70 and consequent engagement of the step 106 on the head 94 with the lever 100. Thus, while the lever 102 remains inactive except upon the return stroke of the pusher, it then oscillates to push slide 107 in the direction of the egg movement in the selector chamber, the lever 102 being slottedly connected with slide 107. This slide 107 is divided into two portions, both mounted in block 108 depending from the floor 96, one portion including the spring 109 to resiliently hold the associated elements in normally retracted position, and the other portion being formed as a rack 110 extending beyond the block 108 and operatively meshing with pinion 111, the proportions of the pinions being such that it is rotated 180 degrees with each reciprocal movement of the rack as actuated by the return stroke of the pusher 70. On the pinion shaft 112 a crank 113 is pivotally mounted in normal position transversely of the longitudinal axis of the selector chamber 71, as when movement through the pinion is terminated. The crank 113 is connected to the pinion by a ratchet 114 operable to rotate the crank 180 degrees when the rack is moved in the direction of egg travel and to immobilize said crank in the position of its last adjustment upon reversed rotation of the pinion as the rack is returned to its original position through expansion of the spring 109 after the pusher 70 releases the lever 108. A guide arm 115 is attached to the flap 99 which extends below the floor 96 through a suitable opening, and is suitably slotted to accommodate a pin 116 attached to the crank 113, the slot extending sufficiently to permit full rotation of the crank 113, and the proportions of the crank and guide arm are such that 180 degree rotation of the crank, from one fixed position to the other, moves the flap from one sidewall 97 to the other, thereby effecting alternate opening of the passageways through the selector as eggs are successively positioned therein. The egg when positioned at the discharge end of the selector chamber aligns itself between ridges 117 of the floor of the selector chamber with the large end of the egg leading in the direction of movement and overhanging the end of the chamber sufficiently to facilitate engagement in a carrier 118 wherein the egg is transported away from the selector chamber to be broken and delivered to cooking elements for further processing.

The carrier 118 is provided with two egg-receiving stalls 119 arranged to accommodate eggs from either or both of the compartments of the selector chamber, the stalls being formed as hemispherically-shaped openings of the size of the large end of an egg by elements later described, the said elements depending from the carrier 118 to form a plane surface 120 parallel with the end of the selector chamber wherein the stalls are positioned to receive the overhanging large ends of eggs in the selector chamber by movement of the carrier to position the surface 120 against the end of the selector chamber. Grooves 121 are provided in the frame of the carrier in a spaced parallelism normal to the surface 120 and thereabove to slidably mount the carrier on track 122, the said tracks being supported between the frame 95 and a frame 123 distally therefrom. The tracks 122 are horizontally disposed normal to the plane of movement of the carriage 63, longitudinally with respect to the table 53 to effect corresponding carrier movement, and are symmetrically positioned above the selector chamber sufficiently to provide operative clearances adequate to permit the frame 118 and certain elements associated therewith to pass over the top of the selector chamber 71 and the surface 120 to contact the end of the chamber as hereinbefore described.

The large end of an egg is resiliently held in either of the stalls 119 by a complementary cup 124 engaging the small end of the egg, the cup being cylindrically formed of rubber or other resilient material, axially aligned with the associated stall 119, and having a tapered recess therein for reception of the small end of the egg. A rod 125 is attached to each cup, axially and oppositely from the recess, to provide a slidable mounting in a bracket 126, the rod and cup being normally extended from the bracket towards the associated stall by a spring 127, thereby providing a resilient adjustment of the cup 124 for various sizes of eggs and a suitable pressure to hold the egg within the stall during subsequent movements of the carrier. A head 128 is provided on the end of the rod 125 to limit its extended position. The bracket 126 is framed as an inverted T-shaped member, with the cross arm 129 thereof horizontally disposed to carry an individual cup for each stall, and with its stem hingedly depending from lugs 130 on pin 131, the lugs extending from the frame 118 sufficiently above the stalls 119 to permit the bracket to be rotated upwards. The bracket 126 is provided with an arcuately formed extension 132 above the lugs 130 whereof the free end extends away from the carrier frame 118 at the level of the tracks 122 for contact with slide bar 133, also mounted on the tracks 122, as the carrier moves towards the selector chamber, the pressure of the extension against the slide bar 133 causing rotation of the bracket to lift the cups above the selector chamber 71 and eggs therein as the carrier is moved against the selector chamber. The bracket 126 is normally resiliently held in depending position by spring 134, and is again lowered as soon as the slide bar 133 is moved away from the carrier, thereby permitting either cup to engage an egg, such movement occurring after the carrier 118 is positioned relative to the selector chamber 71 as later described in detail. Suitable clearance grooves, 135 in the carrier and 136 in the slide bar, are provided to permit the complete lifting of the bracket in the manner described.

Figure 6:
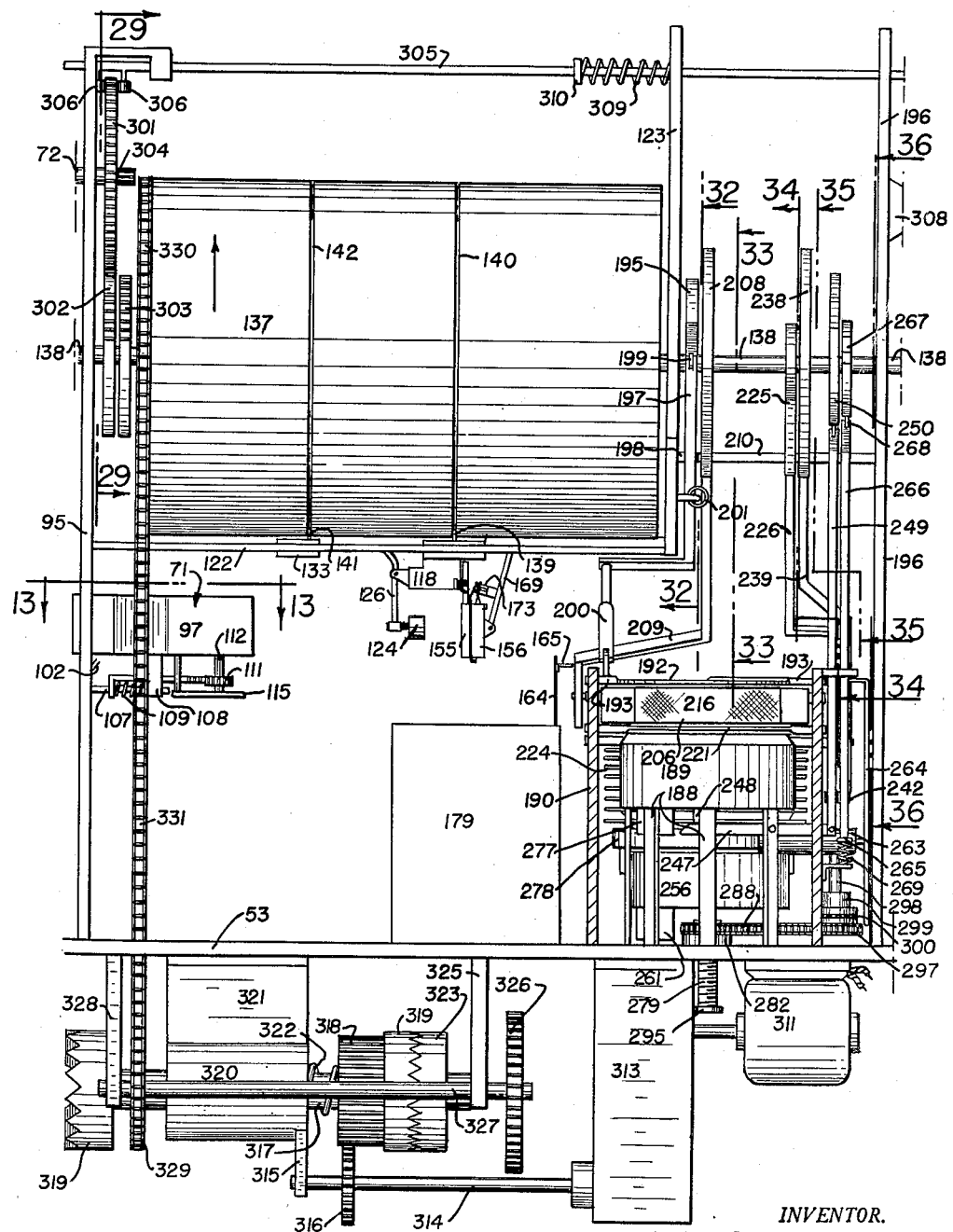
Figure 6 shows, on an enlarged scale, that portion of Figure 2 between lines 5—5 and 6—6 indicated thereon, with sections of covering elements removed to show otherwise concealed relationships.
Figure 8:
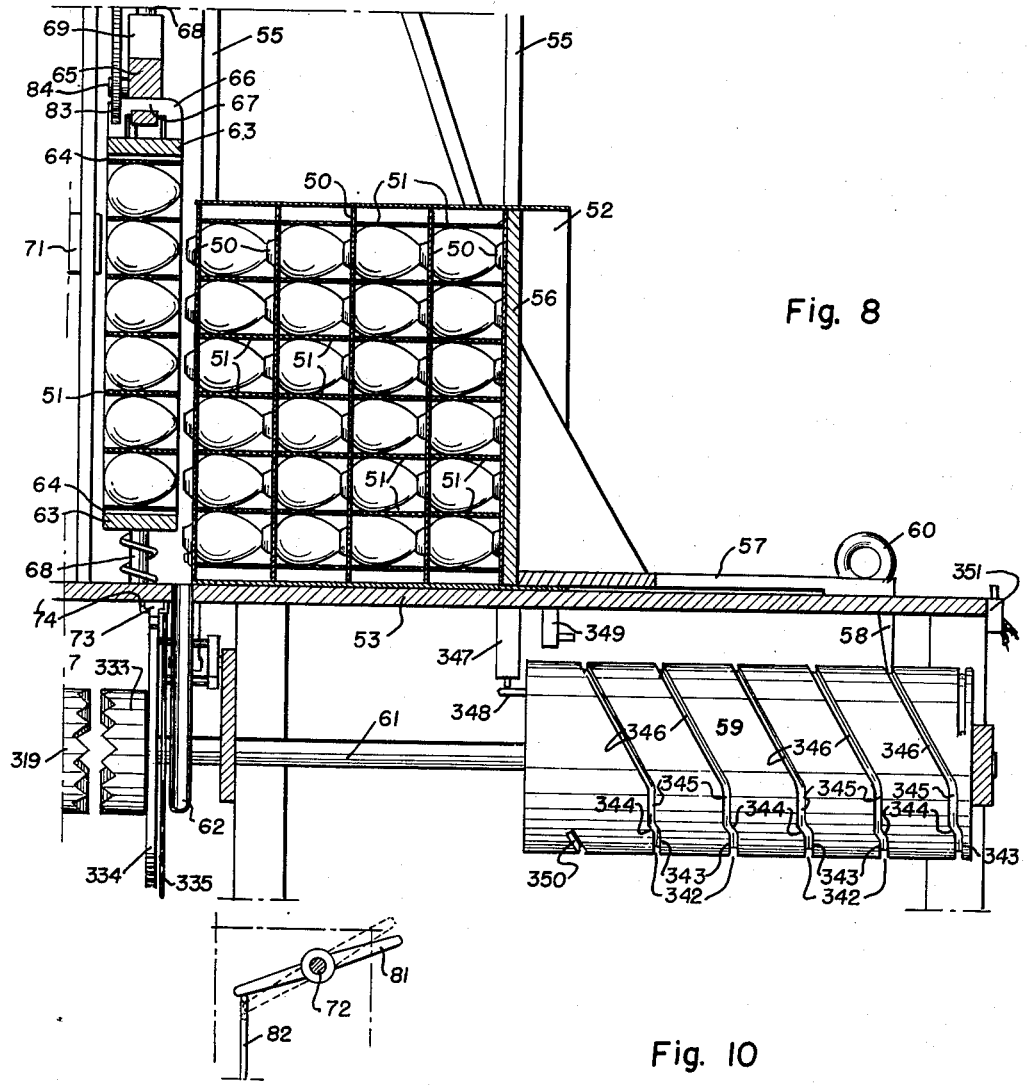
Figure 8 is a detail section taken on the indicated line 8—8 of Figure 3.
Figure 10:
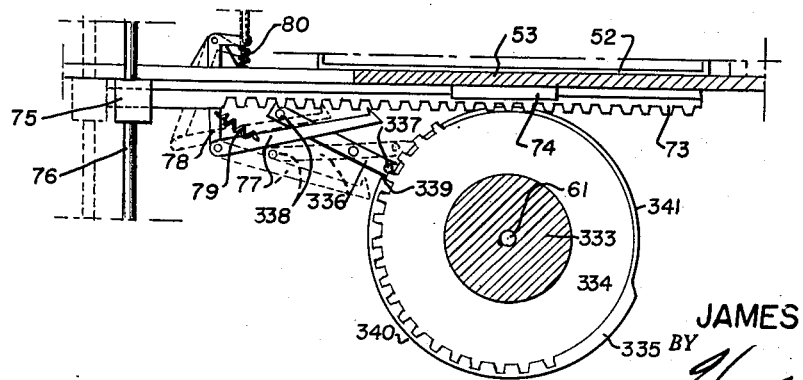
Figure 10 is a fragmentary detail section taken substantially on the indicated line 10—10 of Figure 5, broken lines in the view denoting alternative positions of relatively movable elements.
Figure 9:
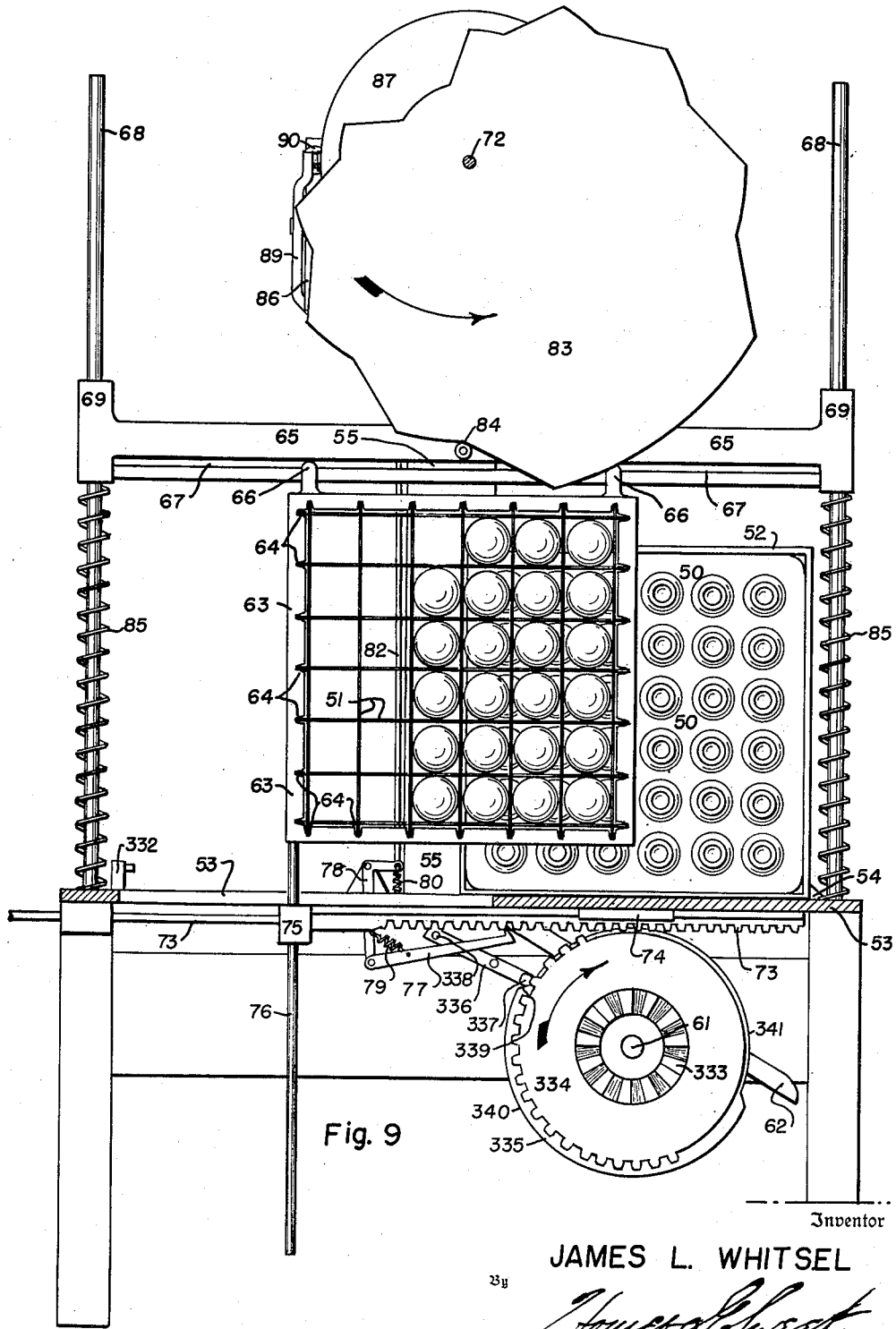
Figure 9 is a detail section taken on the indicated line 9—9 of Figure 3.
Figure 18:
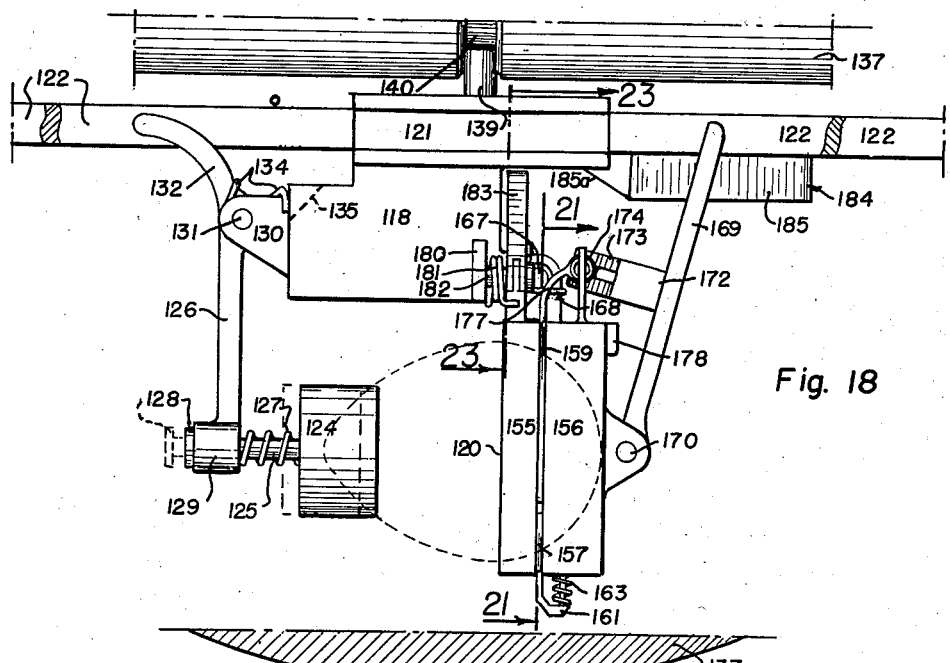
Figure 18 is a side elevation view, on an enlarged scale, of carrier means as illustrated at Figure 6 with portions of covering elements removed to show otherwise concealed relationships.
Figure 19:
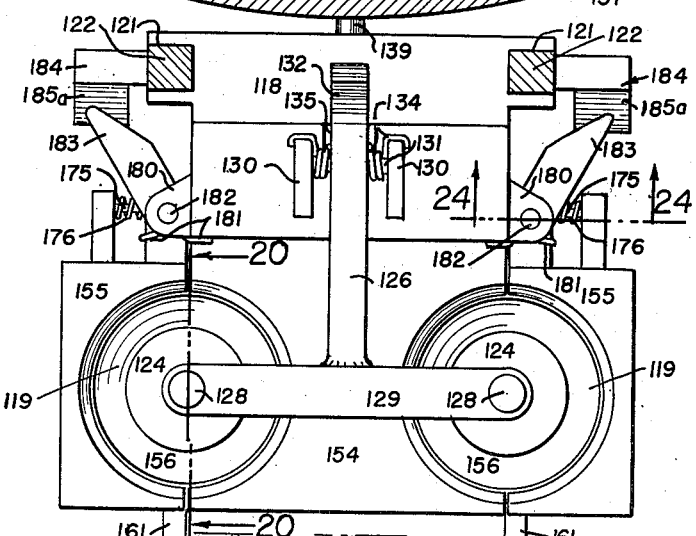
Figure 19 is a left end elevation view, referred to Figure 18, of the carrier means as illustrated at Figure 18.
Figure 20:
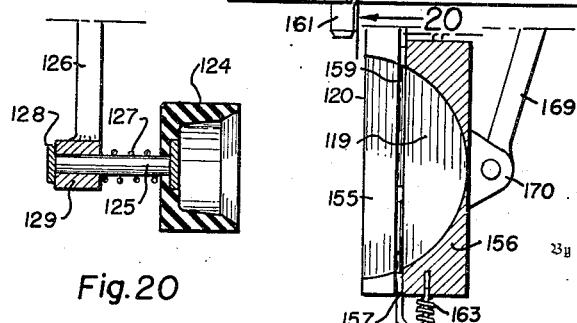
Figure 20 is a fragmentary detail section taken on the indicated line 20—20 of Figure 19.
Figure 31:
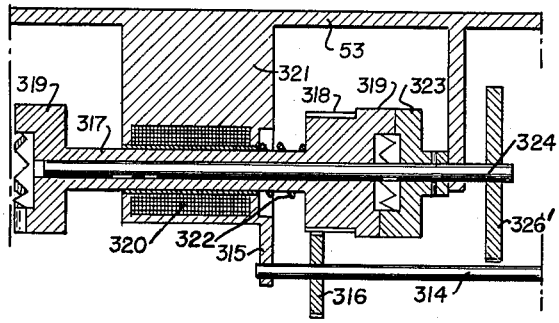
Figure 31 is a section view taken on the indicated line 31—31 of Figure 30.
Figure 47:
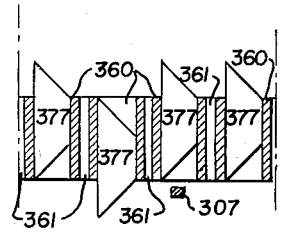
Figure 47 is a fragmentary, detail section, on an enlarged scale, illustrating shiftable control elements as viewed from the indicated line 47—47 of Figure 45, and showing the elements in alternative operative relation.
Figure 48:
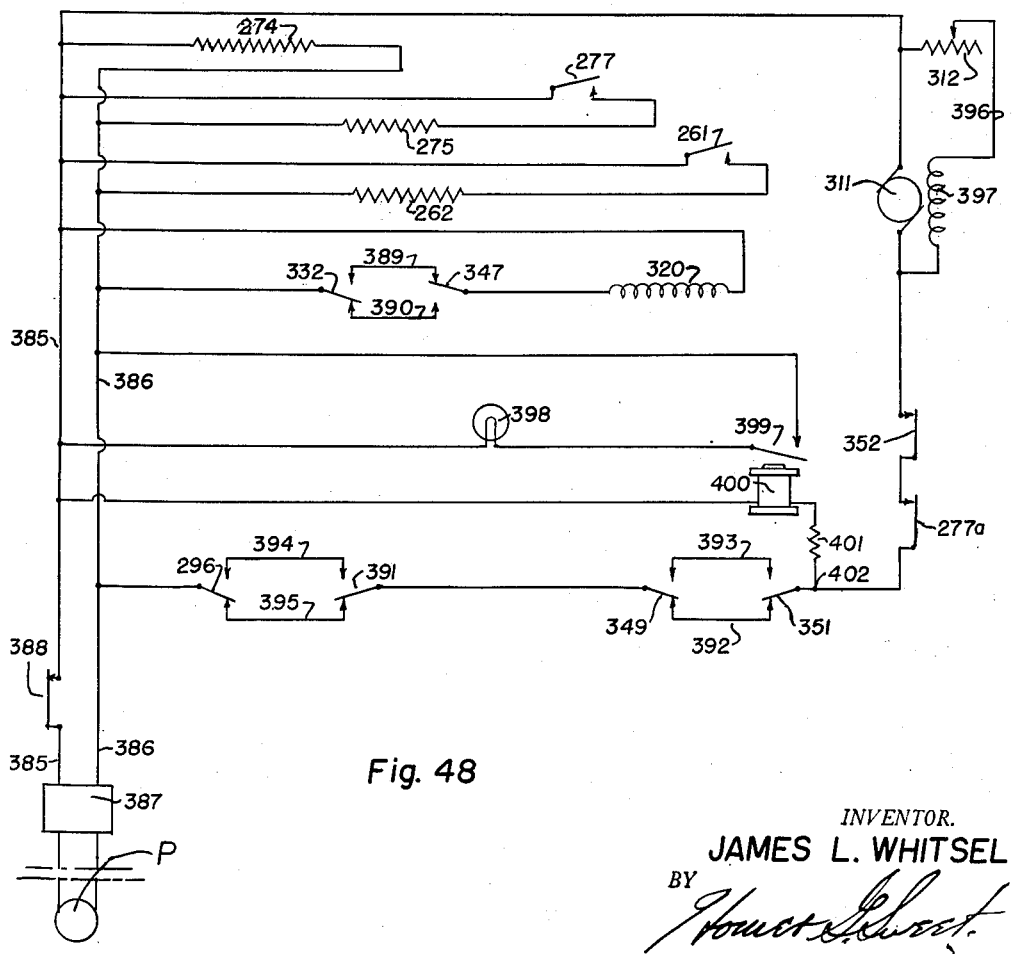
Figure 48 is a conventionalized diagram of the circuits and electrical facilities employed to effect the controls and automatic operative reactions inherent in the apparatus.

Movement of the carrier and the slide bar is accomplished by a cylinder cam 137 mounted upon shaft 138 supported between frames 95 and 123, aligned parallel with the tracks 122 and thereabove to position the cam immediately above the tracks with sufficient clearance for the carrier 118 and the slide bar 133. A follower pin 139 upstanding from the carrier 118 is extended into a groove 140 in the face of the cam whereby rotation of the cam effects movement of the carrier in accordance with the path of the groove 140. Likewise, a pin 141 upstanding from the slide bar 133 engages a groove 142 in the face of the cam 137, whereby rotation of the cam effects movement of the slide bar in accordance with the path of the groove 142. Since this cam 137 effects reciprocation of the carrier 118 to move eggs from the selector chamber to further processing, it is conveniently timed so that one revolution of the cam occurs in that interval necessary for the completion of an egg order. At the initiation of an egg order, an egg being present in the selector chamber, the carrier 118 and the slide bar 133 are positioned as illustrated in Figure 6 with the follower pins 139 and 141 at stations 143 and 144 (Figure 28) in their respective grooves 140 and 142. Rotation of the cam, by means later described, is in a counterclockwise direction as viewed in Figure 29 and in the direction of the arrow A in the developed surface illustrated in Figure 28, the rotation of the cam moving the carrier in accordance with the sloping portion of the groove 140 between the starting station 143 and station 145 to bring it to the discharge end of the selector chamber as hereinbefore described, this phase of movement conveniently coinciding with a 20 degree arc of the cam rotation. The slide bar remains stationary until the bracket 126 is lifted by contact of its extension 132 free end therewith as indicated by the flat portion of the groove 142 between the starting station 144 and station 146. Thence, the groove 142 is sloped parallel with groove 140, the slide bar 133 holding the bracket in lifted position as it passes over the egg in the selector chamber; however, this sloped portion of groove 142 continues beyond the said 20 degree rotation to separate the slide bar from the carrier and thereby permit lowering of the bracket 126 to engage a cup 124 over the smaller end of an egg in the selector, these operations being completed when the pin 141 is at station 147, the termination of the sloping portion of the groove 142. The carrier remains against the selector chamber 71 for a period conveniently indicated by 20 degrees of rotation of the cam, the groove 140 remaining perpendicular to the rotational axis between the stations 145 and 148. This allows sufficient time for the slide bar to lower bracket 126 and for the cups 124 to adjust themselves on the eggs. Thence, the carrier, now charged with an egg load, is moved away from the selector chamber to the cooking elements, through reaction of the pin 139 on the sloping portion of the groove 140 between stations 148 and 149, this phase of movement also conveniently occurring during a 20-degree arc of cam rotation. The carrier remains at this terminal reach of its movement for a convenient period, the groove 140 being perpendicular to the cam axis between stations 149 and 150 for a distance constituting a 20-degree arc of cam rotation. Thence, the carrier is returned to its starting position by means of the groove 140 sloping portion between stations 150 and 151, also conveniently comprised in a 20-degree arc, the station 151 being at the same lateral position as station 143 with the groove perpendicular to the cam axis between said stations for a 260-degree arc of cam rotation. The slide bar 133 remains in retracted position, the groove 142 being unsloped between stations 147 and 152, for a sufficient period to permit the carrier to be removed from the selector chamber, conveniently 20 degrees of cam rotation, whence said slide bar is returned to its position of rest by the sloping portion of the groove 142 between stations 152 and 153, the remainder of said groove being unsloped between stations 153 and 144. This sequence of operations, wherein the movements of the carrier occur over a 100-degree arc of cam rotation with the carrier remaining in its initial or rest position for a 260-degree arc of cam rotation is to permit sufficient time for the subsequent cooking and placing operations later to be described.

The elements forming the egg receiving stalls 119 comprise a central frame 154 depending from the carrier 118 between the stalls, each end thereof forming one-half of a stall periphery, and side clamps 155 hingedly depending from the carrier in alignment with the central frame 154, one on each side thereof, forming the remaining half of the stall peripheries. The frame 154 and clamps 155 resemble a flat plate, one surface forming the plane 120 hithertofore described, with the stalls opening therethrough and into the breaker 156. The breaker is formed as a flat plate hingedly depending from the carrier 118 for oscillation toward and away from parallel registration with the frame 154 and clamps 155, and of sufficient thickness to provide stall depth extensions adapted to receive a sizable portion of the large end of an egg. Between the plane of the frame and clamps and that of the breaker 156, cracking knives 157 are arcuately aligned with a lower segment of each stall periphery in hinged connection with the breaker 156 by means of pins 158, and breaking knives 159 are arcuately aligned with upper segments of the stall peripheries and hingedly connected with the breaker 156 by means of pins 160.

The cracking knives 157 are provided with triggers 161, depending therefrom and extending below the structure formed by the frame 154, the clamps 155, and the breaker 156, the triggers being held in retracted position against pins 162 in the breaker by springs 163. Actuation of the cracking knives occurs as the carrier 118 moves towards the cooking elements with the pin 139 in that portion of the groove 140 between stations 148 and 149, and past the rest position of the carrier, where the lower leading edge of the breaker 156 contacts trip spring 164, upstanding from elements later to be described, the trip spring 164 carrying a knocker 165, offset, and extending laterally therefrom, and reactive against the trigger, the knocker being depressed by the bending of the trip spring 164, remaining so until the spring is released by the passing of the breaker and frame 154, whereupon it flies upwardly to impinge upon the trigger, the force of the blow moving the cracking knife upwards into the egg stall suddenly, in the manner necessary to assure proper cracking of the egg.

The breaker 156 is mounted to hingedly depend from the carrier 118 on a lug 166 of said carrier by means of a pin 167, and is resiliently held toward the frame 154 by a spring 168. A rod 169 is hingedly connected with the breaker by lugs 170 to incline upstandingly from the leading face of the breaker in the direction of movement toward the cooking elements for contact with a stop 171, positioned between the tracks 122, as the carrier approaches its termination of movement toward the said cooking elements. The contact of the rod 169 with the stop 171 causes the breaker 156 to tilt outwardly upon further movement of the carriage toward the cooking elements to open the egg and permit the contents to flow therefrom, the end of the shell being held in the breaker in a manner about to be explained. A cross arm 172 is attached to the rod 169 above the breaker, with slitted wedges 173 protruding therefrom directly above the stalls 119 and between discs 174 slidably carried by rods 175 extending laterally across the breaker and supported thereon by elements upstanding therefrom, the discs being resiliently held against the wedges 173 by springs 176 upon the rods. Upstanding from the breaking knives 159 are fingers 177 attached to the discs 174, whereby separation of the discs by the wedges 173 rotates the knives into the stalls 119 to completely break any egg therein, and to hold the end of the shell thereof, this movement of the wedges occurring before the breaker is tilted away from the frame 154. It follows that the spring 168 is of sufficient strength to permit the wedges 173 to be forced between the discs 174 before the breaker is tilted, the movement of the rod 169 being limited by stop 178, whereupon breaker tilting will occur.

Subsequent to the release of the egg contents, the carrier is returned to its initial position through reaction of the pin 139 in that portion of the groove 140 between stations 150 and 151, as hereinbefore described. As this return movement occurs, the rod 169 is removed from the stop 171, whereupon the breaker is lowered, the wedges 173 slide from between the discs 174 and the knives 159 are retracted from the stalls 119. Next, in its travel to the initial position, the carrier passes over the egg shell receiver 179 whereinto the shell is released by the separation of the clamps 155 which form the outer half of the stall peripheries. Each clamp, hingedly depending from the carrier frame 118 on a lug 180 attached thereto, is resiliently held against the central frame 154 by a spring 181, the clamp and the spring being mounted on a pin 182 attached to the lug 180. An actuating finger 183 is also mounted on the pin 182 in opposition to the clamp, inclining upstandingly to form a compound lever with the clamp and to contact the surfaces of a slide 184. This slide 184 is attached to, and extends in outwardly spaced parallelism with the adjacent track 122; however, the face adjacent to the track forms a vertical plane 185 converging towards the said track in the direction of the return movement of the carrier. During such return movement of the carrier, the finger 183 contacts the plane 185, and is thereby rotated towards the frame 118 whereupon a seat 186 on the finger adjacent to the pin 182 engages the clamp 155 to open it. However, as the carrier completes its movement to the initial position, the actuating finger passes the slide 184 and the clamp 155 closes. In the reverse of the above described operation, with the carrier moving oppositely to deposit the contents of an egg, the finger engages a downwardly inclined surface 185a of the slide 184, and is thereby rotated outwards and away from the frame 118, and this movement of the finger occurs without imparting movement to the clamp 155. It is to be noted that this actuating finger 183 is resiliently held against the clamp in an inclined upstanding position with the seat 186 against the clamp 155, by means not herein shown.

The griddle 187 is a horizontally positioned circular plate, suitably disposed underneath the tracks 122 and frame 123 to receive the deposited egg, and is mounted upon supports 188 which are formed as vertical guides to slidably hold a side 189. This side 189 is a cylindrical shell, altitudinally adjustable, which circumferentially contains the griddle 187. When it is moved upward, it forms as enclosure to hold the egg on the griddle, but when moved downwards, it clears the upper griddle surface to permit the passage of other elements moving horizontally thereacross during the cooking and placing operations about to be described. The griddle and other elements appurtenant thereto are positioned between the walls 190 and 191, upstanding transversely to the shaft 138 from the table 53. Suitable horizontally disposed slots are provided in these walls to guide the movements of other elements as hereinafter described.

Figure 32:
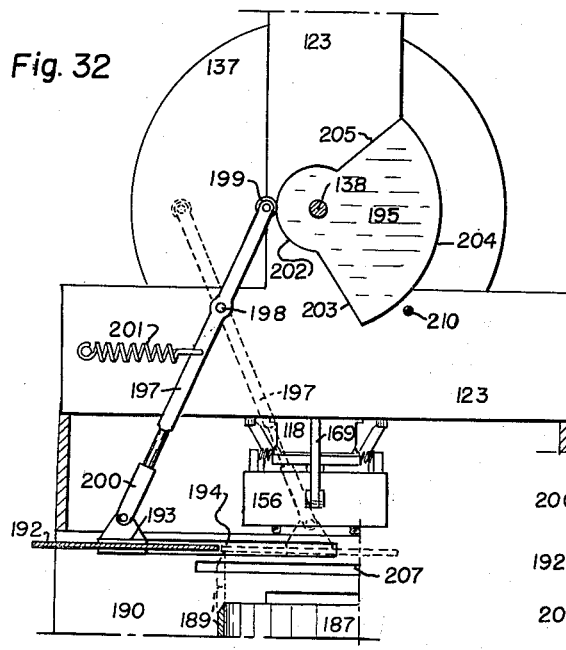
Figure 32 is a fragmentary, detail section taken on the indicated line 32—32 of Figure 6.
Figure 33:
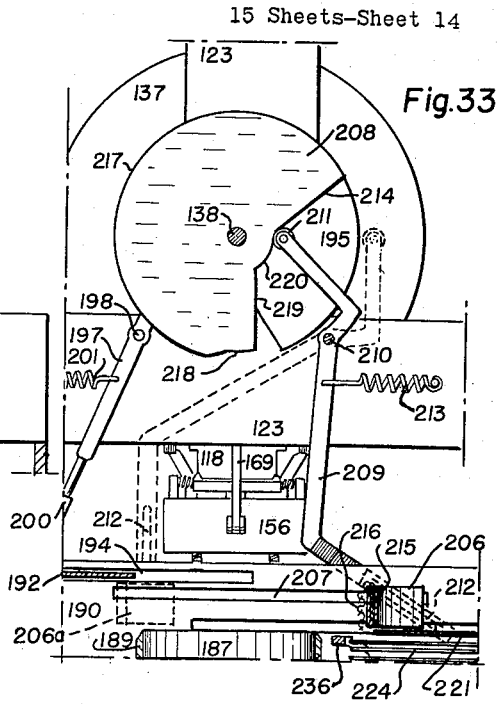
Figure 33 is a fragmentary, detail section taken on the indicated line 33—33 of Figure 6.
Figure 34:
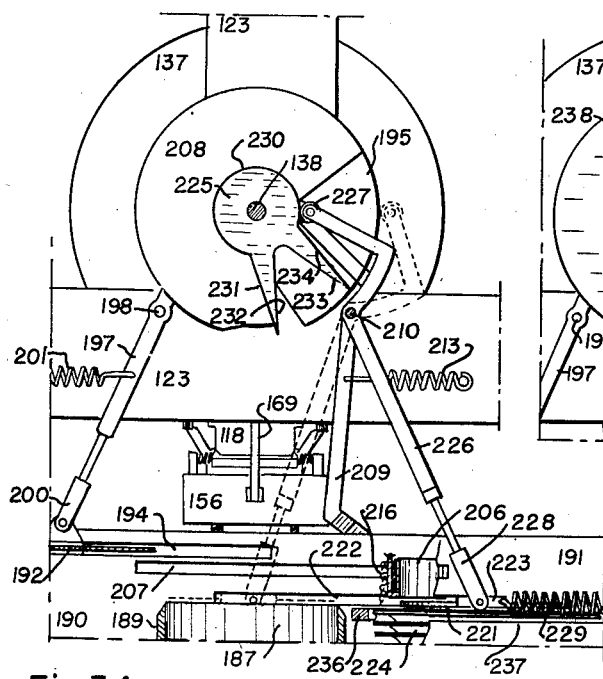
Figure 34 is a fragmentary, detail section taken on the indicated line 34—34 of Figure 6.
Figure 35:
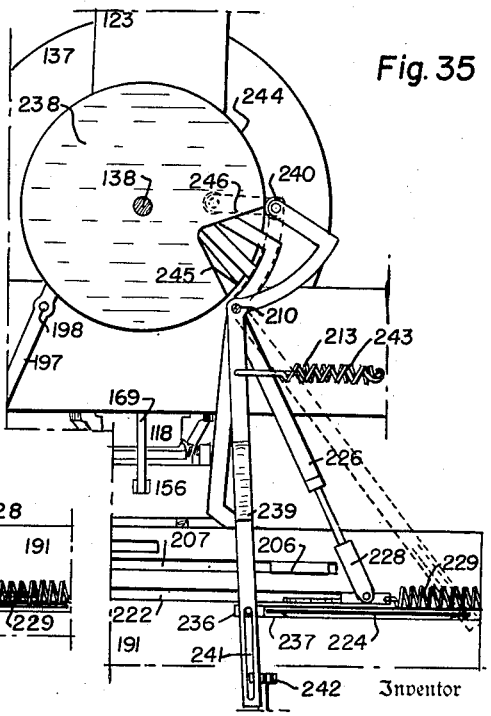
Figure 35 is a fragmentary, detail section taken on the indicated line 35—35 of Figure 6.

One such element is a circular cover 192, to close over the top of the side 189, which is provided with diametrically outstanding guide arms 193, slidably mounted in horizontal slots 194 of the walls 190 and 191 whereby the cover may be moved over the griddle or away therefrom. In initial position, the cover 192 is at one side of the griddle to avoid interference with the deposit of an egg, but it is moved over the griddle for a timed interval and into close adjacency with the upwardly extended side 189, whereupon said side is moved upwardly a small amount to contact the cover and seal the space over the griddle during the cooking operations. Actuation of this cover is had through a cam 195 on the shaft 138, this shaft extending through the frame 123 and through a frame 196 with the cam 195 and other cams about to be described on the shaft 138 between the frames 123 and 196. The cam 195 is connected with the cover by lever 197 hingedly mounted on pin 198 of the frame 123, the lever 197 contacting the cam through follower 199 and being hingedly connected with the guide arm 193 adjacent thereto through telescoping rod 200. A spring 201 resiliently holds the follower 199 against the cam and the cover in corresponding position thereto. Since the cam 195 is mounted upon shaft 138 it operates in coordination with movements of the carrier 118 hereinbefore described, and referring to the point of beginning of rotation as that where the carrier is at its initial or rest position with the pin 139 in groove 140 at station 143 on cam 137, the initial phase of rotation of cam 195, clockwise as viewed in Figure 32, holds the cover away from the griddle to permit the carrier 118 to complete deposit of an egg upon the griddle, this phase continuing for preferably 90 degrees, the cam being of constant radius 202 in that portion of movement. The cam then moves the cover over the griddle in 15 degrees of rotation, the cam being of increasing radii 203 in that portion of movement. Since the cooking period is timed with the rate of rotation of shaft 138, as will be hereinafter described, the cover is held over the griddle for a desirable period of 115 degrees of cam rotation, the cam being of constant radius 204 in that portion movement. Removal of the lid then occurs in 15 degrees of cam rotation, the cam being of decreasing radii 205 in that portion of movement. This returns the cover to its initial position for the remainder of the revolution, the cam being of constant radius 202 in that portion of movement.

A pusher 206, slidably mounted in slots 207 in the walls 190 and 191, is positioned to reciprocate across and above the griddle below the plane of the cover 192, the pusher edge 206a adjacent to the griddle when the pusher is retracted to an inward limit of its travel range being arcuate to effectively engage an egg positioned in its path. Actuation of this pusher 206 is had through a cam 208 mounted upon shaft 138 and reactive on the pusher through a lever 209 hingedly mounted on pin 210 of the frame 123. The lever 209 contacts the cam through follower 211 and is linked to the pusher through slot 212 in its lower end, the lever being formed with a suitable bend to provide clearance of the carrier 118 as the latter moves to the griddle to deposit an egg. A spring 213 resiliently holds the follower 211 against the cam 208 and the pusher in corresponding position thereto. Referring to the point of beginning with pin 139 at station 143, hereinbefore described, the initial position of the pusher is in extension away from the griddle at the outward limit of its travel range. The initial phase of cam 208 rotation moves the pusher across the griddle to its inward limiting position, this phase continuing for 24 degrees, the cam being of increasing radii 214 in that portion of movement. There is provided a well 215 in the top of the pusher extending longitudinally the width of the griddle, and a wick 216 extending therefrom contacts the griddle as the pusher moves thereacross. The well 215 is conveniently filled with grease so that capillary action of the wick spreads a film of grease on the griddle as the pusher passes thereover in this initial phase of movement, the heat from the griddle imparted to the pusher being sufficient to keep the grease in desirable liquid state. The pusher remains in its retracted position for a period of 233 degrees of cam 208 rotation, during which period the egg is sufficiently cooked for removal, the side 189 is lowered and the cover 192 removed from over the griddle, the cam being of constant radius 217 in such portion of its movement. The pusher 206 is then shifted to the adjacent edge of the griddle and held there for 24 degrees of cam rotation, the cam being of reduced radii 218 in such portion of movement. Next, the pusher moves across the griddle to its outward position in 15 degrees of cam rotation, the cam being of decreasing radii 219 in such portion of movement. This cycle returns the pusher to its initial position for the remainder of the cam revolution, the cam being of constant radius 220 in such portion of its movement.

A spatula 221, slidably mounted in slots 222 in the walls 190 and 191 by arms 223 diametrically outstanding therefrom, is positioned above the griddle to slidably engage the surface thereof and pass a prepared egg thereon to carry the latter from the griddle and to a plate stack 224. Actuation of this spatula is had through a cam 225 mounted upon shaft 138, and connected with the spatula by a lever 226 hingedly mounted upon pin 210. The lever 226 contacts the cam through follower 227 and engages the spatula through a telescoping rod 228 hingedly connected with the guide arm 223 adjacent thereto. This lever is formed with a suitable bend to provide clearance for the contours of cam 225. A spring 229 resiliently holds the follower 227 against the cam 225 and the spatula in corresponding position thereto. Referring to the point of beginning with pin 139 at station 143, hereinbefore described, the initial position of the spatula 221 is remote from the griddle and over the plate stack 224. The spatula remains in this position until the egg on the griddle is cooked, for a period of 257 degrees of cam 225 rotation, the cam being of constant radius 230 in such portion of its movement. The spatula is then moved over the griddle under and to pick up the egg. The movement being 24 degrees of cam rotation in coordination with that moving the pusher to the edge of the griddle as hereinbefore described to permit the pusher to hold the egg as the spatula moves thereunder. During this 24-degree movement, the cam 225 is of increasing radii 231. Next, the spatula moves in coaction with the pusher to the position over the plate stack in 15 degrees of cam rotation, the cam being of decreasing radii 232 in such portion of its movement. With the spatula and pusher over the plate stack, the next phase of action is to deposit the egg onto a plate, which is accomplished by retracting the spatula from beneath the egg while the pusher remains stationary. This phase of movement occurs in a 24 degree cam rotation, the cam being of increasing radii 233 in such portion of its movement. The next phase of movement returns the spatula to its initial position in a 20 degree cam rotation, the cam being of decreasing radii 234 in such portion of its movement. The remainder of the cam revolution retains the spatula in initial position, the cam during such phase being of constant radius 230.

The previously described movements complete the deposit of a cooked egg upon the plate stack 224, the plates being preferably of conventional cardboard type easily separable in an arrangement such that the top plate in the stack may be pushed onto a service tray 235 mounted on the table 53, the pushing means being a contact bar 236 slidably mounted in slots 237 in the walls 190 and 191. This bar is normally positioned between the plate stack and the griddle, and below the top of the griddle to permit clearance of the spatula and to engage the top plate in the stack which is also sufficiently below the spatula to permit satisfactory clearances between the plate and spatula with an egg deposited upon the plate. Actuation of the bar 236 to push a plate onto the tray 235 is had through cam 238 mounted upon shaft 138, said bar being connected with said cam through lever 239 hingedly mounted upon pin 210. The lever 239 contacts the cam through follower 240 and engages the bar through slot 241 in the lower end thereof, the slot being suitably extended to actuation a pinion 242 for purposes hereinafter described. A spring 243 resiliently holds the follower 240 against the cam 238 and the bar 236 in corresponding position thereto. Referring to the point of beginning with pin 139 at station 143, the initial position of the bar 236 is between the plate stack and the griddle where it remains for a period of cam rotation of 320 degrees to permit the egg to be deposited on a plate with the spatula 221 moved from thereunder. During this 320 degrees of rotation, the cam 238 is of constant radius 244. The bar 236 then reacts to move the plate onto tray 235 in 20 degrees of cam rotation, the cam being of decreasing radius 245 in that portion of movement. Next, the bar returns to its original position in the remaining portion of cam revolution, the cam being of increasing radius 246 in that portion of movement.

The side 189 is in its downward or retracted position at the point of beginning as defined with pin 139 at station 143. The side-raising means comprises a rocker 247 hingedly mounted between supports 188 below the side, suitably aligned parallel with the longitudinal axis of the table 53. One end of the rocker 247 contacts a bar 248 diametrically attached to the side 189 and positioned transversely to the lever 247. Actuation of the rocker 247 is had through a reciprocating rod 249 hingedly upstanding from the other end of the rocker through guiding means suitably attached to the wall 191 and reactive to cam 250 mounted on shaft 138. In the operation of the machine, the side remains in its retracted position for a period of 24 degrees of cam 250 rotation to permit the pusher 206 to move across the griddle to its retracted position 207, the cam being of constant radius 251 in that portion of movement. The side 189 is then raised to an initial position by depressing the rod 249 in a period of 15 degrees of cam rotation, the cam being of increasing radii 252 in that portion of movement. The initially raised position is such that the side will not contact the cover 192 as it moves into position, and the cam is of constant radius 253 for a period of 66 degrees of rotation to accommodate shift of said cover. However, after the cover 192 is in place, the side is raised sufficiently to contact with the cover and effect a direct sealing action therewith thus providing a closed container for a steaming period as will be hereinafter described, the period of side and cover cooperation being 112 degrees of cam 250 rotation, and the cam being of constant radius 254 in that portion of movement. Before the cover is removed, the side is lowered slightly, to its initially raised position to permit the cover to be withdrawn, and the side is held in that position for 25 degrees of cam rotation, the cam being of constant radius 253 in such portion of its movement. Next, the side is lowered to its retracted position to permit the movement of the pusher and spatula relative to the griddle, the lowering movement requiring 15 degrees of cam rotation, the cam being of decreasing radii 255 in such portion of its movement. Through the remaining portion of the cam revolution, the side remains in its initial retracted position, the cam being of constant radius during such portion of its cycle.

In the cooking of an egg, it is desirable to baste the egg with live steam, for cooking of that part of the egg remote from direct contact with the griddle; the advantages of such treatment being well known in the art. Such basting is accomplished in the present invention during that period when the side 189 is contacting the cover 192 by means of steam supplied from boiler 256 which is conveniently placed underneath the rocker 247 and between the supports 188 and is of an enclosed construction susceptible of holding water vapor under pressure as limited by a safety valve 257 thereon. A charge of water is conveniently placed in this boiler through an orifice in the top thereof closed by a cap 258, the cap threadedly engaging the orifice to tightly seal the latter. A thermal well 259 upstanding in the lower portion of this boiler permits exposure of thermostat 260 therein to boiler water temperature, the thermostat being of conventional type to actuate heating control 261 within desirable temperature ranges, approximately 220 degrees F. being a satisfactory median temperature. The heating control 261 is a conventional circuit breaker switch reactive to the thermostat 260 to open when the temperature within the boiler exceeds a given maximum of 225 degrees F. or to close when the temperature becomes less than 215 degrees F., the switch being in circuit with a heating coil 262 underneath the boiler. The steam passes from the boiler through a valve 263, thence into a flexible tube 264 connected with and passing through a guide arm 193 of the cover 192, the exit orifice of the tube being directed downwards with respect to said cover to discharge into the closed griddle. The flow of steam is controlled by valve 263, said valve being of a conventional type provided with a shut-off handle 265 horizontally disposed to be actuated by reciprocating rod 266 held in upstanding alignment by guiding means suitably attached to the wall 191 and contacting cam 267 through follower 268, all held against the cam by spring 269 disposed underneath the shut-off handle. The cam 267, attached to shaft 238, is of constant radius 270 for 105 degrees of cam rotation beginning at the starting position defined with pin 139 at station 143 to permit the cover to be engaged by side 189. Thereafter, the cam 267 is of decreasing radius 271 for 10 degrees of cam rotation to permit the rod 266 to lift and open valve 263. Steam is permitted to enter the closed griddle for a period of 50 degrees of cam rotation, sufficient to accomplish the desired cooking, and the cam 267 is of constant radius 272 during this period of operation. The valve is then closed in 10 degrees of cam rotation, the cam being of increasing radii 273 during this period of operation. Thenceforth, the valve remains closed, the cam being of constant radius 270 for the remainder of its rotation.

The heating elements within the griddle comprise two resistance coils 274 and 275, the coil 274 being of such resistance that the flow of current therethrough will generate sufficient heat to hold the griddle to a minimum temperature of 250 degrees F., and the coil 275 being of such resistance and capacity as to provide a large amount of heat, as needed. A thermostat 276 is suitably attached to the griddle to actuate a heating control 277 within the desirable temperature range. This heating control 277 is a conventional circuit breaker switch reactive to the thermostat 276 to open when the griddle temperature exceeds 255 degrees F. or to close when the temperature becomes less than 250 degrees F., the switch being in circuit with heating coil 275.

The plate stack, 224, is suitably supported on a platform 278, preferably circular in shape, horizontally disposed, and provided with a circular recess in the upper surface thereof of suitable size to hold and align the plate stack in operative position. This platform is altitudinally adjustable by means of a jack screw 279 centrally and fixedly depending therefrom, and held in alignment on a horizontal plane by guide rods 280 fixedly depending therefrom and attached to the platform 278 adjacent to the periphery thereof and evenly spaced angularly thereof, the guide bars being slidably received through bosses 281 in the table 53. The jack screw 279 is operatively held in and altitudinally adjustable through the agency of thread clutch 282 mounted on table 53, the jack screw 279 being of sufficient length to extend through the table in a suitable opening therein which mounts the thread clutch 282. The thread clutch 282 is provided with an outer support race 283 suitably mounted in an insert in the table 53 with the lower portion of the body 284 formed as an inner race rotatably mounted inside the outer support race 283 by balls 285 as a conventional ball bearing. The central portion of this body 284 contains thread engaging lugs 286 diametrically and slidably mounted therein for selective engagement with the threads of the jack screw 279, the body being of sufficient size to contain said lugs in suitable slots extending radially from the jack screw, and preferably cylindrical in shape. The upper portion of this body 284 is formed as a sprocket 287 engaging chain 288 and rotatable thereby, the rotation thereof being suitably correlated with the pitch of the jack screw threads to move the platform 278 upwards to supply plates to the bar 236 in accordance with the completion of egg orders. The thread-engaging lugs 286 are slotted, diametrically of the jack screw, and each provided with a pin 289 transversely of its slot positioned to contact fingers 290 and 291 which respectively depend and upstand from upper and lower actuating cylinders 292 and 293; the said cylinders being slidably mounted inside the body 284 and in clearing relation with the jack screw 279. The fingers 290 depending from the upper actuating cylinder 292 are outwardly bevelled on their inner surfaces engageable with that side of the pins 289 remote from the jack screw therebetween, whereby downward movement of the cylinder 292 pushes the lugs 286 into engagement with the threads of the jack screw 279. The fingers 291 upstanding from the lower actuating cylinder 293 are inwardly bevelled on their outer surfaces engageable with that side of the pins 289 adjacent to the jack screw therebetween, whereby upward movement of the cylinder 293 pushes the lugs 286 out of engagement with the threads of the jack screw 279. The upper and lower cylinders 292 and 293 must act on the lugs alternatively, and are thus joined by spacers 294, whereby upward movement of the lower cylinder to engage the lugs with the jack screw also causes upward movement of the upper cylinder to free the said lugs for inward travel. A head 295 is provided at the bottom of the jack screw 279, whereby upward movement of the jack screw to dispose of plates through rotation of the thread clutch eventually causes the head to contact the bottom of the cylinder 293, such contact occurring upon disposal of the last plate of the stack, whereupon further rotation of the thread clutch moves the cylinder 293 upwards to disengage the said lugs 286, releasing the platform and permitting it to fall to its lower position. This fall is terminated by the lower side of the platform striking the upper surface of the cylinder 292, which extends suitably above the upper portion 287 of the thread clutch, whereby the upper cylinder is depressed and the lugs are again engaged to repeat the cycle upon the recharge of the plate stack.

This final movement, the falling and reengagement of the lugs occurs upon the completion of an egg order, as will be soon described, and the fall of the platform operates the actuating lever of cut-out switch 296 which shuts off the driving mechanisms, preventing further operation of the machine, thereby permitting the operator to recharge the plate stack before starting the machine for further orders.

Intermittent rotation of the thread clutch 282 to raise the platform in steps of one plate thickness is accomplished by movement of the chain 288 connected therewith and to sprocket 297 on shaft 298, the shaft 298 being upstandingly mounted upon the wall 191, in suitable bearings 299 and carrying the pinion 242 on its upper end. The sprocket 297 is freely rotatable with respect to the shaft 298, and is connected thereto by ratchet 300, the ratchet being so adjusted that the sprocket reacts to pinion 242 roation deriving from that phase of lever 239 oscillation marking return of the bar 236 to its original position, as hereinbefore described.

As previously mentioned, the egg frying machine is arranged to furnish a single egg or a double egg order, the carrier 118 being provided with two stalls 119 whereby two eggs may be engaged therein and both simultaneously cracked, opened, and deposited upon the griddle 187, the heating controls adjustable through the thermostat 276 permitting a double egg order to be as properly cooked as a single egg order in the same time period. To obtain a double egg order, it is necessary only that an egg be placed in each compartment of the selector chamber 71. At the beginning of a cycle, as hereinbefore defined as pin 139 being at station 143, there is one egg deposited in a compartment of the selector chamber 71. The rotation of shaft 72 is controlled by rotation of shaft 138, the respective shafts being geared through gears 301 and 302 for single egg orders, and through gears 301 and 303 for double egg orders, the gear 301 being slidably attached to shaft 72 to selectively engage either gear 302 or 303 attached to shaft 138 adjacently. The gear 302 is mutilated with sufficient teeth to provide only 30 degree rotation of gear 301 upon a complete revolution of the shaft 138 in such disposition as to mesh with the gear 301 after the shaft 138 has rotated 40 degrees from the hereinbefore defined starting point to permit the carrier 118 to move away from the selector chamber carrying an egg while at the same time another egg is being pushed into the selector chamber by pusher 70 for subsequent transfer. The gears 301 and 302 are so proportioned that a 30 degree rotation of gear 301 requires a 40 degree rotation of gear 302, and the teeth on gear 302 hence extend over a 40 degree arc. The gear 303 is likewise mutilated, but is toothed over an 80 degree arc with meshing commencing at the hereinbefore starting point. Therefore, as the carrier is moved towards the selector chamber, with gears 301 and 303 engaged, an egg is immediately pushed into a compartment of the selector chamber to provide two eggs therein, this movement occurring in the first 20 degrees of rotation of the shaft 138 as the carrier approaches the selector chamber. During the next 20 degrees of rotation of the shaft 138, and 15 degrees of rotation of the shaft 72, another egg is aligned with the pusher 70, while, at the same time, the carrier engages the two eggs in the selector chamber. Further rotation of the shafts 138 and 72 moves the carrier away from the selector chamber and another egg thereinto, the second 40-degree engagement of the gears operating similar to meshed engagement of the gears 301 and 302.

The gear 301 is slidably attached to shaft 72 through a spline 304 thereon and is shiftably controlled by an actuating rod 305 wherefrom two rollers 306 depend with the gear therebetween. The actuating rod is slidably mounted in frames 95, 123 and 196 in horizontal disposition parallel with shafts 72 and 138, the appropriate end thereof being pin connected to a lever 307 hingedly mounted on lugs 308 outstanding from the frame 196 for engagement by controls hereinafter described; the controls being operable to depress lever 307 to effect alignment of the gears 301 and 303 for a double egg order. A compression spring 309 is mounted on rod 305 by collar 310 to normally align gear 301 with gear 302 for single egg orders.

Actuation of the egg frying machine is had through a motor 311 attached to the underside of the table 53, the field windings of the said motor being connected in series with a variable resistance 312, more fully hereinafter described, to control the speed of motor rotation so that the operator may regulate the actual timing of the entire operation, and especially the cooking operation, to provide suitably prepared eggs in accordance with the condition of the eggs or the desires of the customers. The output shaft of the motor is connected into a suitable gear reduction box 313 also attached to the underside of the table 53, the output shaft 314 of the said box being extended in spacedly parallel relationship with the longitudinal axis of the machine and shaft 138, and the end of the shaft remote from the gear reduction box is suitably supported in a lug 315. A spur gear 316 on the shaft 314 meshes with gear 318 of a double-acting clutch shifting head 317. This shifting head 317 is formed as a shaft having clutch discs 319 at each end and its gear 318 adjacent the clutch 319 nearest the box 313. It is slidably and rotatably mounted in a solenoid 320 supported by web 321 depending from the table 53, the axis of the shifting head being disposed parallel with shaft 314. The gear 318 is of metal reactive to the solenoid 320 to cause the shifting head to move the gear thereagainst whenever the solenoid is energized, the toothed face of the gear being elongated to provide engagement with gear 317 throughout the axial shifting movements. A spring 322 is provided to normally hold the gear 318 remote from the solenoid 320 with the disc 319 adjacent thereto in engagement with its companion disc 323. This disc 323 is pin mounted upon a shaft 324 supported by the shifting head and a frame depending from the table 53, the shifting head being of hollow tubular construction to accommodate the shaft 324 in common axial relation. A suitable spur gear 326 is attached to shaft 324 for engagement with a companion spur gear 326 attached to a shaft 327 supported by frames 325 and 328 in parallel alignment with the shaft 324 and shaft 138 mounting the various cams and drives hereinbefore described; moreover, the shaft 327 is preferably aligned directly below the shaft 138 to facilitate a sprocket-chain connection therewith in a form accommodating clearance of the selector chamber 71 between its spaced runs. A sprocket 329 is attached to the shaft 327 in a plane common with a sprocket 330 attached to the shaft 138 adjacent to the cylinder cam 137 with chain 331 connecting therebetween. It follows that, in normal operation of the egg-frying machine, the motor 311 is engaged to drive the shaft 138 through mating of the clutch discs 319 and 323, and such condition continues as long as the solenoid 320 is not energized.

The solenoid is energized by a switch 332 positioned on the table 53 adjacent to the standard 68 remote from the egg receptacle 52 in such manner that the side of the carriage 63 engages the actuating arm of said switch upon exhaustion of the last egg column therein by an initial movement of the detent 77 tending to pull the carriage beyond its position of alignment of the last egg column with the pusher 70. Such switch actuation energizes the solenoid 320 to move the shifting head 317 to disengage the discs 319 and 323, thereby bringing all movements originated by the rotation of the shafts 72 and 138 to a halt. However, the clutch disc 319 remote from the box 313 mates with its companion disc 333 which is attached to the shaft 61 as a consequence of head 317 shift. This shaft 61 is provided with the cam 59 hereinbefore described, a mutilated gear 334 aligned for engagement with rack 73, and a disconnect cam 335 positioned adjacently thereto. A rocker 336 is pin mounted on suitable framework depending from the table 53, one end thereof being provided with a follower 337 which contacts the periphery of the cam 335, and the other end carrying an extending pin 338 engageable with the detent 77. Beginning with an initial point of rotation, the cam 335 has a portion of increasing radii 339 whereby rotation of the shaft 61 causes the rocker 336 to depress detent 77 and disengage it from the rack 73. This disengagement is maintained for a 190 degree rotation of shaft 61, the cam being of constant radius 340 in such portion of its movement. During the remainder of shaft 61 rotation it is unnecessary to hold the detent 77 away from the rack 73 and the cam is of constant but lesser radius 341 in such portion of its movement. Upon depressing of the detent 77 away from the rack 73, the teeth of the mutilated gear 334 engage the rack, the rotation of the gear being such that the carriage 63 is returned to initial charging alignment with the receptacle 52, there being sufficient teeth in the mutilated gear for this purpose only, and the size of the gear being such that a rotation of approximately 170 degrees of shaft 61 is effective to do this, the gear and rack being disengaged during the remainder of shaft rotation 61. The cam 59 is provided with a continuous groove 342 in which the finger 58 is registered, the groove being divided into five identical stages, one for each of the five egg layers which may be placed in the receptacle 52, each stage being completed in a single revolution of the cam. In the first portion of shaft rotation 61, the groove at a given stage is flat or normal to the shaft axis, whereby no translation of the platen 56 occurs, this flat zone 343 extending for 190 degrees of shaft rotation. Next, the groove at each of its stages is provided with an offset 344 effective through the finger 58 and consequent platen 56 shift to move the forward egg layer of the charge sufficiently to free the forward separator plate from the receptacle 52, and this offset is followed by a flat zone 345 to permit the egg layers in the receptacle to remain stationary during a period sufficient for disposal of the forward separator plate 50 in the manner as hereinbefore described, this flat zone conveniently being a span of 15 degrees of cam rotation. Next, the groove is provided at each of its stages with an incline 346 whereby the forward egg layer in the receptacle is pushed into the carriage 63, this incline accounting for the balance of the 360 degrees of shaft 61 rotation.

A spring switch 347 is mounted underneath the table 53 so the actuator arm thereof at times contacts a pin 348 extending from the cam 59, such contact occurring as the revolution of the shaft 61 is completed to shift an egg layer from the receptacle into the carriage. This switch 347 is connected in circuit with the switch 332 in such manner that closing of the switch 347 deenergizes the solenoid 320 to permit disengagement of the discs 319 and 339 and reengagement of the discs 319 and 323 to reestablish the regular moving and cooking operations hereinbefore described.

There is a cut-out switch 349 mounted underneath the table 53 in direct alignment with the finger 58 and actuable thereby. The final operating stage, wherein all eggs are removed from the receptacle 52, proceeds in a normal manner until the carriage 63 is returned through 180 degrees of shaft 61 rotation into registration with the now empty receptacle. Beyond this point, groove 342 terminates in an offset 350 which moves the finger 58 against switch 349, thereby stopping the entire machine until the receptacle 52 is recharged. This switch 349 is in circuit with a switch 351 in an arrangement necessitating manual actuation of the latter to initiate movement of the apparatus upon the replenishment of an egg charge.

The option indication means provided, whereby a given number of egg orders is selectively chargeable into the apparatus, are reactive to operate a switch 352 in circuit with the motor 311, the switch being closed during operation of the machine to deliver egg orders, but opened by pressure of a lug 353 upon its actuating element to stop the machine. This lug 353 is attached to the end of a bar 354 having a rectangular shaped opening longitudinally thereof to permit it to be slidably but non-rotatively engaged over a guide 355, the guide being positioned in horizontal transverse alignment with respect to the longitudinal axis of the table 53 by a standard 356 on the table and suitable attachments to sidewalls 357 upstanding from the table 53. A finger 358 projects transversely from the inner end of this bar to engage suitable spaces in a block belt 359 which is mounted in spacedly parallel relation with the bar 354 and guide 355, whereby movement of the bar 354 along the guide 355 reflects engagement of the finger 358 with the belt 359 at all bar positions. The belt 359 is formed from suitable rectangular blocks 360, joined together in spaced relation by a central web 361 with the juncture between adjacent blocks forming the spaces to engage the finger 358. This belt is mounted upon sprockets 362 and the shafts thereof 363 and 364 which are positioned transversely to the belt and in spacedly parallel relation with the shafts 72 and 138, the shaft 363 being positioned between the walls 357 for free rotation, while the shaft 364 is positioned between the wall 357 and the frame 196 in driven engagement with shaft 138 through spur gears 365 and 366. The movement of the belt is thus related to movement of the shaft 138 and the cams thereon, the gears 365 and 366 being so proportioned as to move the belt one block space with each revolution of the shaft 138, and directed to shift the bar 354 engaged therewith towards the switch 352; actuating engagement of the switch occurring as the bar attains its terminal position at one extreme end of the belt flat portion between the sprockets 362, and such engagement to open the switch 352 is so timed with respect to the rotation of the shaft 138 as to occur when said shaft is at the point of beginning of an egg preparing cycle, as hereinbefore defined as that position where pin 139 is at station 143.

A plurality of pins 367 project from the bar 354 on the side of the bar adjacent to the wall 357, and are aligned horizontally in uniform spatial relationship corresponding with the spaces in the block belt 359. These pins 367 are individually engageable by an incline 368 attached to a frame 369 which is slidably mounted on perpendicular guide bars 370 attached to the wall 357. The frame 369 is normally held above the pins 367 by springs 371 compressively mounted on the bars 370 underneath the frame, whereby depression of the frame causes the incline 368 to engage a pin 367 and thereby move the bar 354 laterally away from the switch 352, the finger 358 being sufficiently resilient to slip from one slot to another in the belt 359 upon initiation of such movement. The depression of the frame is accomplished manually by means of a tongue 372 extending through a suitable slot in the wall 357 elongated vertically to accommodate corresponding movement of the tongue, the vertical movement being susceptible of correlation with suitable spaced intervals 373 calibrated to indicate lateral movement of the finger 358 from one slot to the next on the belt 359. In this manner, successive option indications of a desired number of egg orders is possible. Upon initiation of the machine operation, the bar 354 is positioned with its lug 353 holding the switch 352 open. By pressing the tongue 372 one interval 373, the finger 358 is moved over one slot in the belt 359 and a complete rotation of shaft 138 and corresponding delivery of an egg order may then occur before the lug again opens switch 352 to stop the machine. Likewise a plurality of egg orders is possible, or groups of egg orders, as when the tongue 372 is depressed two intervals 373, released and then depressed four intervals 373, the incline 368 engaging different pins 367 in each such operation. As the incline 368 engages a pin 367 to move it laterally, the following pins 367 in the sequence are positioned above the incline during its downward movement, and provision must be made to free the pins as the incline is returned to its normal position above the pins. The incline is formed with a plurality of spaced lugs 374 fixed to outstand from the frame 369, and flaps 375 therebetween hingedly connected to the frame, all suitably aligned to form an oblique track having a flat under surface against which a pin 367 may slidably engage. The flaps have their ends bevelled suitably to permit them to open downward but to lock against lugs 374 in response to upward pressure of a pin engaged by the incline, and springs 376 are provided to hold the flaps closed between the lugs. In this manner, any pins 367 positioned above the incline during the downward movement of the incline, are free to oscillate and pass through the flaps 375 as the frame 369 is returned to its initial position.

The blocks 360 of the belt 359 are provided with rectangular openings therein transversely to the belt axis, the openings slidably housing trapezoidal wedges 377 with sufficient frictional resistance to require a definite force to shift them within the openings. These wedges 377 are longer than the blocks, and are normally positioned therein with the forepoints adjacent the wall 357 extending beyond the blocks, and with the forepoints oppositely therefrom encased within the blocks.

At the end of the bar 354 adjacent to the finger 358 there is located a wedge slide 378, slidably attached to the bar 354 by pin 379, in perpendicular disposition to provide vertical movement of the slide 278, the slide being held normally above the wedges 377 by a spring 380 compressively mounted on the pin 379 underneath the slide 378. Depression of this slide to engage the forepoint of a wedge 377 is accomplished by bar 381, horizontally disposed in parallel relation with bar 354 above the slide 378 to provide engagement therewith at all respective positions encountered through movement of the bar 354, the bar 381 being slidably connected to the wall 357 by a lug 382 depending therefrom, engaging the wall in a suitable slotted connection, and provided with a tongue 383 projecting through the wall for manual actuation and normally held in upward position by means of the spring 380 below slide 378. Upon depression of the tongue 383 simultaneously with the depression of the tongue 372, the slide 378 is lowered in line with the wedges 377, and movement of the bar 354 by depression of tongue 372 causes the wedges 377 to slidably alter their position to extend the forepoints normally encased in the blocks in alignment with the lower end of lever 307 to engage and actuate the said lever for provision of a double egg order in the manner hereinbefore described; the position of the lever 307 with respect to the wedges 377 being such that the engagement occurs at the properly timed interval as the egg order is initiated; all such being possible through suitable timing of the shaft 138 in its connection with the belt 359. Upon subsequent travel of the belt, after the extension of the wedge 377 has performed its function of completing a double egg order, the wedge engages a lug 384 spaced adjacently to the belt in position to slidably engage the wedge and push it into its normal position hereinbefore described.

The electrical circuits for the operation of the improved apparatus are powered from a suitable source P with leads 385 and 386 extending therefrom, through a suitable rectifier 387 in line to establish a direct current supply if necessary, and with a suitable manually operable control switch 388 in the main line for cutting off all circuits. One complete circuit is that formed by the resistance coil 274 of the griddle operable at all times whenever the switch 388 is closed. Another circuit includes the resistance coil 275 and the heating control circuit breaker switch 277, this circuit being operable with switch 388 closed, and with switch 277 closed through action of the thermostat 276. Another circuit includes the heating coil 262 of the boiler 256 and the control circuit breaker switch 261, this circuit being operable with switch 388 closed, and with switch 261 closed through action of the thermostat 256. Another circuit includes the solenoid 320, and switches 332 and 347, the switches 332 and 347 having double contact terminals with leads 389 and 390 connecting corresponding contact terminals of the respective switches, the arm of each switch alternatively connecting with one of its double terminals in response to actuation thereof. These switches contact oppositely connected terminals respectively during regular operation of the machine, holding the circuit open and the solenoid 320 deenergized, but switch 332 is shifted to close the circuit upon depletion of the egg charge in the carriage 63, and remains so during shifting of switch 347 to open the circuit upon replenishment of an egg charge in the carriage, all as hereinbefore explained.

The motor circuit includes the motor 311, the switch 352, the switch 351, the switch 349, a heater control circuit breaker switch 277a, the switch 391, and the switch 296, all switches being necessarily positioned to provide a closed circuit before operation of the motor is possible. The switch 352 is normally closed by setting the indicating means hereinbefore described, and opened by pressure of lug 353 on bar 354 to control the delivery of egg orders. The switches 349 and 351 have double contact terminals with leads 392 and 393 each connecting corresponding contact terminals of the respective switches, the arm of each switch alternatively connecting one of its double terminals in response to actuation thereof. During regular operation of the machine the contact terminals are connected with a common lead to provide circuit therethrough, but upon exhaustion of an egg charge from the receptacle 52 the switch 349 is shifted to its alternate terminal, thereby opening the circuit, which may be again closed by manually shifting switch 351 after replenishment of an egg charge. The switch 277a, in conjunction with switch 277, is operable by thermostat 276, and opens whenever the temperature of the griddle is less than 245 degrees to assure operation of the egg-frying apparatus only when there is a suitably hot griddle. The switches 296 and 391 have double contact terminals with leads 394 and 395, each connecting with corresponding contact terminals of the respective switches, the arm of each switch alternatively connecting one of its double terminals in response to actuation thereof. During regular operation of the machine the contact terminals are connected with a common lead to provide circuit therethrough, but upon exhaustion of the plate stack 224 the switch 296 is shifted to its alternate terminal, thereby opening the circuit, which may be again closed by shifting switch 391 manually upon replenishment of a plate stack.

In circuit 396 parallel with the motor 311 is the field coil 397 and the variable resistance 312 suitably mounted on the wall 357 in the form of a rheostat control whereby the speed of the motor may be controlled.

A circuit is provided containing a light 398 and switch 399, the said switch reacting to be held open by a relay 400 in a further circuit in parallel with the motor circuit containing in common the switches 349, 351, 391, and 296; the circuit containing the said switches energizing the relay whenever the said switches are positioned to close the motor circuit, and the switch 399 being closed whenever the motor circuit is broken, whereby the lamp issues a warning signal whenever an egg charge or plate stack is depleted. A suitable resistance 401 may be placed in circuit with light 398 and switch 399 to reduce the voltage drop at the juncture 402 of the compound circuit.

In an alternate embodiment, the heating means may employ an inflammable fuel, preferably gas, the resistance coils 262, 274 and 275 of the boiler 256 and griddle 187, respectively, being replaced by gas burners 262a, 274a, and 275a. The burner 274a is so designed that the flow of gas therethrough will generate enough heat to hold the griddle at a temperature of 250 degrees F., while the burner 275a is of large capacity to supply heat as needed, a valve 403 being connected therewith to control the flow of gas into the burner and the said valve being direct connected to the thermostat 276 and actuatable thereby. The gas line 404 connecting these burners may be furnished with a suitable control valve 405 and a pilot light 406. Likewise, the burner 262a, not shown, is suitably connected through a valve 403, the valve in turn being direct connected to the thermostat 260 and actuatable thereby, and the gas line thereto may be furnished with a control valve 405 and a pilot light 406. It is to be noted that in this alternate embodiment, the circuits including the resistance coils 274, 275, and 262, and switches 277 and 261 are not necessary, inasmuch as they are replaced by substitute fuel supply lines and their adjuncts.

Since changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. An egg frying machine comprising an egg charge receptacle, a transfer chamber fixedly correlated with said receptacle, means characterized by a carriage laterally and altitudinally adjustable between said receptacle and transfer chamber for individually shifting eggs from the receptacle to sequential deposit in the transfer chamber, a fixed griddle spaced from said transfer chamber, means reciprocable between and for the translation of eggs from the transfer chamber to the griddle, means for opening the eggs for deposit of their contents upon the griddle as an incident of and in the terminal phase of their translation, means for transferring cooked eggs from the griddle to a position of availability, driven means synchronously correlating the said transferring means in time-spaced lag with the translation means to establish a predetermined cooking interval, a motor powering said driven means, and indexing means driven by said motor in automatic control of motor operation.

2. An egg frying machine comprising an egg charge receptacle, a transfer chamber fixedly correlated with said receptacle, means characterized by a carriage laterally and altitudinally adjusted between said receptacle and transfer chamber for individually shifting eggs from the receptacle to sequential deposit in the transfer chamber, a fixed griddle spaced from said transfer chamber, means reciprocable between and for the translation of eggs from the transfer chamber to the griddle, means for opening the eggs for deposit of their contents upon the griddle as an incident of and in the terminal phase of their translation, a plate stack, means for transferring cooked eggs from the griddle to the plate stack, means for the delivery of egg-charged plates from the plate stack to a position of availability in correlation with and subsequent to the said transferring step, driven means synchronously correlating the said transferring means in time-spaced lag with the translation means to establish a predetermined cooking interval, a motor powering said driven means, and indexing means driven by said motor in automatic control of motor operation.

3. An egg frying machine comprising an egg charge receptacle, a carriage laterally and altitudinally adjustable relative to said receptacle, means for moving egg groups from the receptacle and to the carriage, a transfer chamber fixedly correlated with said receptacle at the side of the carriage remote from the receptacle, means for individually shifting eggs from the carriage to sequential deposit in the transfer chamber, a fixed griddle spaced from said transfer chamber, means reciprocable between and for the translation of eggs from the transfer chamber and to the griddle, means for opening the eggs for deposit of their contents upon the griddle as an incident of and in the terminal phase of their translation, a plate stack, means for transferring cooked eggs from the griddle and to the plate stack, means for the delivery of egg-charged plates to a position of availability in correlation with and subsequent to the said transfer step, driven means synchronously correlating the said transferring means in time-spaced lag with the translation means to establish a predetermined cooking interval, a motor powering said driven means, and indexing means driven by said motor in automatic control of motor operation.

4. An egg frying machine comprising an egg charge receptacle, a carriage laterally and altitudinally adjustable relative to said receptacle, means for moving egg groups from the receptacle and to the carriage, a transfer chamber fixedly correlated with said receptacle at the side of the carriage remote from the receptacle, means for individually shifting eggs from the carriage to sequential deposit in the transfer chamber, a carrier, a fixed griddle spaced from said transfer chamber, means for reciprocating the carrier between the transfer chamber and the griddle, means associated with the carrier for picking up eggs from the transfer chamber, means associated with the carrier for opening the eggs therein for deposit of their contents upon the griddle as an incident of and in the corresponding terminal phase of the carrier reciprocation, a plate stack, means for transferring cooked eggs from the griddle and to the plate stack, means for the delivery of egg-charged plates from the plate stack and to a position of availabiltiy in correlation with and subsequent to the said transfer step, driven means synchronously correlating the said transferring means in time-spaced lag with the carrier reciprocation to establish a predetermined cooking interval, a motor powering said driven means, and indexing means driven by said motor in automatic control of motor operation.

5. An egg frying machine comprising an egg charge receptacle, a carriage, means for moving egg groups from the receptacle and to the carriage, a transfer chamber, means for individually shifting eggs from the carriage to sequential deposit in the transfer chamber, a carrier, a griddle, means for reciprocating the carrier between the transfer chamber and the griddle, means associated with the carrier for picking up eggs from the transfer chamber, means associated with the carrier for opening the eggs therein at one terminal phase of the carrier reciprocation for deposit of their contents upon the griddle, a spatula, a plate stack, means for effecting movement of the spatula from the griddle to the plate stack, means associated with the spatula for picking up cooked eggs from the griddle and transfer thereof to the plate stack, means for the delivery of egg-charged plates to a position of availability in correlation with and subsequent to the said spatula movement, driven means synchronously correlating the spatula movement in time-spaced lag with the carrier reciprocation to establish a predetermined cooking interval, a motor powering said driven means, and indexing means driven by said motor in automatic control of motor operation.

6. The organization according to claim 5, wherein the said egg charge receptacle is a cubical shell having two opposing ends open, into which a conventionally formed egg stack, comprising layers of grille-enclosed eggs with separator plates therebetween, may be slidably inserted through an open end with the separator plates normal to the direction of stack movement in frictional engagement with the sides of the said cubical shell.

7. The organization according to claim 5, wherein the said egg charge receptacle is a cubical shell having two opposing ends open, into which a conventionally formed egg stack, comprising layers of grille-enclosed eggs with separator plates therebetween, may be slidably inserted through an open end with the separator plates normal to the direction of stack movement in frictional engagement with the sides of the said cubical shell, and the said means for moving egg groups from the receptacle to the carriage comprises a platen, extended guide arms attached thereto, and means associated with said guide arms for intermittent movement of the platen into the said receptacle in steps of egg layer thickness with the platen perpendicular to the direction of its movement into the receptacle whereby it may engage a terminal separator plate to push egg layers through the said receptacle.

8. The organization according to claim 5, wherein the said carriage is a rectangularly-apertured frame, associated with selectively-shiftable means to provide intermittent registration of its aperture with an open discharge end of the receptacle in operative correlation with the means for moving egg groups to receive an egg layer discharged from the receptacle.

9. The organization according to claim 5, wherein the said carriage is an upstanding rectangularly-apertured frame for the accommodation of a conventional grille-encased egg layer, and the said means for sequential egg shift from the carriage to the transfer chamber comprises a pusher directed toward the transfer chamber and oriented normal to the plane of the carriage frame, selectively-shiftable carriage moving means for carriage translation between the pusher and the transfer chamber to effect selective registration of eggs in the carriage with the pusher, and pusher-actuating means operatively correlated with the selectively-shiftable carriage moving means for pusher projection through the carriage aperture upon said registration to move an egg from the carriage and into the transfer chamber.

10. The organization according to claim 5, wherein the said means for reciprocation of the carrier between the griddle and the transfer chamber comprises two horizontally disposed tracks in spaced parallelism reaching between the transfer chamber and the griddle, guides outstanding from the carrier engageable on said tracks, a shaft in spaced parallelism with and above the tracks, means for rotating the shaft by and in synchronism with said driven means, a cylindrical cam concentrically mounted on said shaft, a groove in the said cam delineating the carrier movement correlated with the cam rotation, and a follower pin upstanding from the carrier engaging the said groove.

11. The organization according to claim 5, wherein the said griddle comprises a frame, a horizontally disposed circular plate thereon, means for heating said plate for cooking operations, a vertically-axised cylindrical side closely fitting the plate and slidably mounted upon the frame, means for altitudinal adjustment of the side whereby it may be raised above the plate to form an enclosure and lowered to permit other elements to move thereacross, a lid, means for lateral movement of the lid between a position of registration above the plate and a plate-clearing disposition at one side of the plate, a steam tank, a steam line therefrom to the said lid, and means for the feed of steam through the said line when the lid is closed against the elevated side in registration with the plate to provide a basting operation.

12. The organization according to claim 5, wherein said griddle is constituted as a cooking plate, a plate side enclosure, means for lifting and lowering said side enclosure relative to the plate, a lid laterally shiftable into and out of closing registration with said side enclosure, and means for moving said lid, and the said means associated with the spatula for picking up cooked eggs from the griddle and for transfer thereof to the plate stack comprises a member spatially above the griddle and spatula, means for movement of said member correlated with the means for movement of the spatula and with the lid movement means and with the side lifting means whereby movement of the member and spatula occurs with the side lowered and the lid out of registration therewith and the member engages the egg upon the griddle plate while the spatula moves thereunder as a first phase of operation, then both the member and spatula shift to the plate stack where the member is arrested while the spatula reverses its movement to pass from underneath the egg for release thereof to a plate.

JAMES L. WHITSEL.

References Cited in the file of this patent

UNITED STATES PATENTS

| Number | Name | Date |
|---|---|---|
| 1,361,121 | Weiss | Dec. 7, 1920 |
| 1,716,266 | Flamm | June 4, 1929 |
| 1,904,198 | Brand | Apr. 18, 1933 |
| 1,940,071 | Brand | Dec. 19, 1933 |
| 1,945,788 | Pilley | Feb. 6, 1934 |
| 2,015,358 | Brokvist | Sept. 24, 1935 |
| 2,033,178 | Brand et al. | Mar. 10, 1936 |
| 2,356,707 | Sigler | Aug. 22, 1944 |
| 2,369,274 | Beatty | Feb. 13, 1945 |